United States Patent
Damera-Venkata et al.

(10) Patent No.: US 8,429,517 B1
(45) Date of Patent: Apr. 23, 2013

(54) GENERATING AND RENDERING A TEMPLATE FOR A PRE-DEFINED LAYOUT

(75) Inventors: Niranjan Damera-Venkata, Mountain View, CA (US); Eamann O'Brien-Strain, San Francisco, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 238 days.

(21) Appl. No.: 12/775,337

(22) Filed: May 6, 2010

(51) Int. Cl.
*G06F 17/00* (2006.01)
*G06F 17/21* (2006.01)
*G06F 17/22* (2006.01)

(52) U.S. Cl.
USPC .......................................... 715/205; 715/243

(58) Field of Classification Search .................. 715/204, 715/205, 243
See application file for complete search history.

(56) References Cited

U.S. PATENT DOCUMENTS

| | | | |
|---|---|---|---|
| 5,848,184 A * | 12/1998 | Taylor et al. | 382/173 |
| 2002/0163518 A1* | 11/2002 | Rising et al. | 345/440 |
| 2007/0003166 A1* | 1/2007 | Berkner | 382/298 |
| 2008/0144942 A1* | 6/2008 | Besley et al. | 382/209 |

OTHER PUBLICATIONS

Iria et al, "Web News Categorization using a Cross-Media Document Graph", 2009, ACM, pp. 1-8.*

* cited by examiner

*Primary Examiner* — Doug Hutton, Jr.
*Assistant Examiner* — Soumya Dasgupta

(57) ABSTRACT

Examples directed to methods and systems for generating and rendering a template for a pre-defined layout. For example, an underlying graph structure of a pre-defined layout comprising at least one pre-placed object is determined. Information from the underlying graph structure is placed into a plurality of matrices. One or more pre-placed object parameters of the pre-defined layout are also determined. The plurality of matrices are utilized in conjunction with the one or more pre-placed object parameters to determine location coordinates and size information for the one or more pre-placed objects. In so doing, a template based on the location coordinates and size information for the one or more pre-placed objects is rendered.

7 Claims, 18 Drawing Sheets

$$\bar{\theta} = \begin{bmatrix} \theta_f \\ \theta_{fp} \\ \theta_p \\ m_{w1} \\ m_{w2} \\ m_{h1} \\ m_{h2} \end{bmatrix} \quad \bar{x}_1 = \begin{bmatrix} w_f \\ 0 \\ 0 \\ 1 \\ 1 \\ 0 \\ 0 \end{bmatrix} \quad \bar{y}_1 = \begin{bmatrix} h_f \\ 1 \\ 1 \\ 0 \\ 0 \\ 1 \\ 1 \end{bmatrix}$$

FIG. 3B

$$\bar{\theta} = \begin{bmatrix} \theta_{f1} \\ \theta_{f2} \\ \theta_{ff} \\ \theta_{fp} \\ \theta_{p} \\ m_{w1} \\ m_{w2} \\ m_{h1} \\ m_{h2} \end{bmatrix} \quad \bar{x}_1 = \begin{bmatrix} w_{f1} \\ w_{f2} \\ 1 \\ 0 \\ 0 \\ 1 \\ 1 \\ 0 \\ 0 \end{bmatrix}$$

$$\bar{y}_1 = \begin{bmatrix} h_{f1} \\ 0 \\ 0 \\ 1 \\ 1 \\ 0 \\ 0 \\ 1 \\ 1 \end{bmatrix} \quad \bar{y}_2 = \begin{bmatrix} 0 \\ h_{f2} \\ 0 \\ 1 \\ 1 \\ 0 \\ 0 \\ 1 \\ 1 \end{bmatrix}$$

FIG. 4B

$$\bar{\theta} = \begin{bmatrix} \theta_{f1} \\ \theta_{fp1} \\ \theta_{f2} \\ \theta_{fp2} \\ \theta_{fp3} \\ \theta_{fp4} \\ m_{w1} \\ m_{w2} \\ m_{h1} \\ m_{h2} \end{bmatrix} \quad \bar{x}_1 = \begin{bmatrix} w_{f1} \\ 1 \\ 0 \\ 0 \\ 0 \\ 0 \\ 1 \\ 1 \\ 0 \\ 0 \end{bmatrix} \quad \bar{x}_2 = \begin{bmatrix} 0 \\ 0 \\ w_{f2} \\ 1 \\ 0 \\ 0 \\ 1 \\ 1 \\ 0 \\ 0 \end{bmatrix}$$

$$\bar{y}_1 = \begin{bmatrix} h_{f1} \\ 0 \\ 0 \\ 0 \\ 1 \\ 1 \\ 0 \\ 0 \\ 1 \\ 1 \end{bmatrix} \quad \bar{y}_2 = \begin{bmatrix} 0 \\ 0 \\ h_{f2} \\ 0 \\ 1 \\ 1 \\ 0 \\ 0 \\ 1 \\ 1 \end{bmatrix}$$

| Left/Right | A | B | C | D | E | r |
|---|---|---|---|---|---|---|
| l | $\theta_{lA}$ | | $\theta_{lC}$ | | | |
| A | | $\theta_{AB}$ | | | | |
| B | | | | | | $\theta_{Br}$ |
| C | | | | $\theta_{CD}$ | $\theta_{CE}$ | |
| D | | $\theta_{DB}$ | | | | |
| E | | $\theta_{EB}$ | | | | |

1220

| Bottom/Top | A | B | C | D | E | t |
|---|---|---|---|---|---|---|
| b | | $\theta_{bB}$ | $\theta_{bC}$ | | $\theta_{bE}$ | |
| A | | | | | | $\theta_{At}$ |
| B | | | | | | $\theta_{Bt}$ |
| C | $\theta_{CA}$ | | | | | |
| D | $\theta_{DA}$ | | | | | |
| E | | | | $\theta_{ED}$ | | |

FIG. 12

GENERATING AND RENDERING A TEMPLATE FOR A PRE-DEFINED LAYOUT

TECHNICAL FIELD

The disclosure is related to the field of document layout, and in particular, to generating and rendering a template for a pre-defined layout.

BACKGROUND

A mixed-content document can be organized to display a combination of text, images, headers, sidebars, or any other elements that are typically dimensioned and arranged to display information to a reader in a coherent, informative, and visually aesthetic manner. Mixed-content documents can be in printed or electronic form, and examples of mixed-content documents include articles, flyers, business cards, newsletters, website displays, brochures, single or multi page advertisements, envelopes, and magazine covers just to name a few. In order to design a layout for a mixed-content document, a document designer selects for each page of the document a number of elements, element dimensions, spacing between elements called "white space," font size and style for text, background, colors, and an arrangement of the elements.

In recent years, advances in computing devices have accelerated the growth and development of software-based document layout design tools and, as a result, increased the efficiency with which mixed-content documents can be produced. A first type of design tool uses a set of gridlines that can be seen in the document design process but are invisible to the document reader. The gridlines are used to align elements on a page, allow for flexibility by enabling a designer to position elements within a document, and even allow a designer to extend portions of elements outside of the guidelines, depending on how much variation the designer would like to incorporate into the document layout. A second type of document layout design tool is a template. Typical design tools present a document designer with a variety of different templates to choose from for each page of the document. FIG. 1 shows an example of a template 100 for a single page of a mixed-content document. The template 100 includes two image fields 101 and 102, three text fields 104-106, and a header field 108. The text, image, and header fields are separated by white spaces. A white space is a blank region of a template separating two fields, such as white space 110 separating image field 101 from text field 105. A designer can select the template 100 from a set of other templates, input image data to fill the image fields 101 and text data to fill the text fields 104-106 and the header.

However, it is often the case that the dimensions of template fields are fixed making it difficult for document designers to resize images and arrange text to fill particular fields creating image and text overflows, cropping, or other unpleasant scaling issues. FIG. 2 shows the template 100 where two images, represented by dashed-line boxes 201 and 202, are selected for display in the image fields 101 and 102. As illustrated in the example of FIG. 2, the images 201 and 202 do not fit appropriately within the boundaries of the image fields 101 and 102. With regard to the image 201, a design tool may be structured to crop the image 201 to fit within the boundaries of the image field 101 by discarding peripheral, but visually import, portions of the image 201, or the design tool may attempt to fit the image 201 within the image field 101 by rescaling the aspect ratio of the image 201, resulting in a visually displeasing distorted image 201. Because image 202 fits within the boundaries of image field 102 with room to spare, white spaces 204 and 206 separating the image 202 from the text fields 104 and 106 exceed the size of the white spaces separating other elements in the template 100 resulting in a visually distracting uneven distribution of the elements. The design tool may attempt to correct for this by rescaling the aspect ratio of the image 202 to fit within the boundaries of the image field 102, also resulting in a visually displeasing distorted image 202.

BRIEF DESCRIPTION OF THE DRAWINGS

FIG. 3B shows vector characterization of template parameters and dimensions of an image and white spaces associated with the template illustrated in FIG. 3A in accordance with one example.

FIG. 4B shows vector characterization of template parameters and dimensions of images and white spaces associated with the template illustrated in FIG. 4A in accordance with one example.

FIG. 5B shows vector characterization of template parameters and dimensions of images and white spaces associated with the template illustrated in FIG. 5A in accordance with one example.

FIG. 12 is a block diagram of a first and second incidence matrix in accordance with one example.

DETAILED DESCRIPTION

Figure 1:
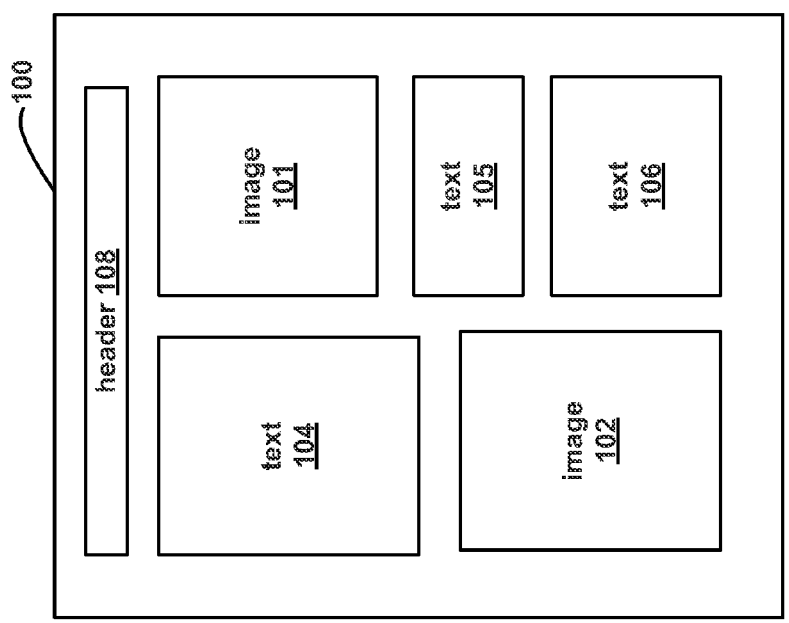
FIG. 1 shows an example of a template for a single page of a mixed-content document.
Figure 2:
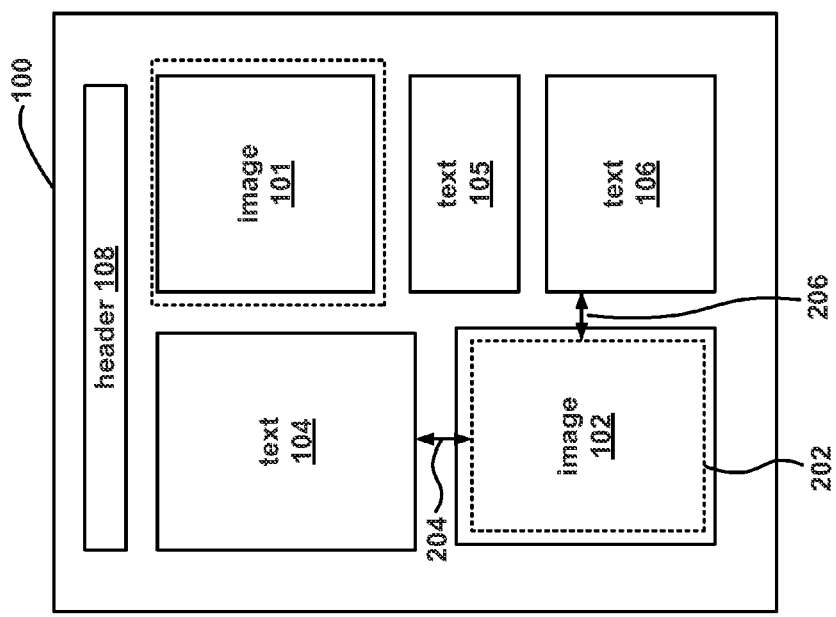
FIG. 2 shows the template illustrated in FIG. 1 with two images selected for display in the image fields.

An example of a method for generating and rendering a template for a pre-defined layout is disclosed. In one example, an underlying graph structure of a pre-defined layout comprising at least one pre-placed object is determined. Information from the underlying graph structure is placed into a plurality of matrices. One or more pre-placed object parameters of the pre-defined layout are also determined. The plurality of matrices are utilized in conjunction with the one or more pre-placed object parameters to determine location coordinates and size information for the one or more pre-placed objects. In so doing, a template based on the location coordinates and size information for the one or more pre-placed objects is rendered.

Examples are described below with reference to numerous equations and graphical illustrations. In particular, examples are based on Bayes' Theorem from the probability theory branch of mathematics. Although mathematical expressions alone may be sufficient to fully describe and characterize examples to those skilled in the art, the more graphical, problem oriented examples, and control-flow-diagram approaches included in the following discussion are intended to illustrate examples so that the systems and methods may be accessible to readers with various backgrounds. In order to assist in understanding descriptions of various examples, an overview of Bayes' Theorem is provided in a first subsection, template parameters are introduced in a second subsection, and probabilistic template models based on Bayes' Theorem for determining template parameters are provided in a third subsection.

An Overview of Bayes' Theorem and Related Concepts from Probability Theory

Readers already familiar with Bayes' Theorem and other related concepts from probability theory can skip this subsection and proceed to the next subsection titled Template Parameters. This subsection is intended to provide readers who are unfamiliar with Bayes' Theorem a basis for understanding relevant terminology, notation, and provide a basis for understanding how Bayes' Theorem is used to determine document template parameters as described below. For the sake of simplicity, Bayes' theorem and related topics are described below with reference to sample spaces with discrete events, but one skilled in the art will recognize that these concepts can be extended to sample spaces with continuous distributions of events. Furthermore, a number of the examples provided herein are similar to the examples 5.1 and 5.2 disclosed in the book "Probability: an introduction" by Samuel Goldberg-Page 74-77, which are provided herein for purposes of clarity.

A description of probability begins with a sample space S, which is the mathematical counterpart of an experiment and mathematically serves as a universal set for all possible outcomes of an experiment. For example, a discrete sample space can be composed of all the possible outcomes of tossing a fair coin two times and is represented by:

$$S = \{HH + HT + TH + TT\}$$

where H represents the outcome heads, and T represents the outcome tails. An event is a set of outcomes, or a subset of a sample space, to which a probability is assigned. A simple event is a single element of the sample space S, such as the event "both coins are tails" TT, or an event can be a larger subset of S, such as the event "at least one coin toss is tails" comprising the three simple events HT, HT, and TT.

The probability of an event E, denoted by P(E), satisfies the condition $0 \leq P(E) \leq 1$ and is the sum of the probabilities associated with the simple events comprising the event E. For example, the probability of observing each of the simple events of the set S, representing the outcomes of tossing a fair coin two times, is ¼. The probability of the event "at least one coin is heads" is ¾ (i.e., ¼+¼+¼), which are the probabilities of the simple events HH, HT, and TH, respectively).

Bayes' Theorem provides a formula for calculating conditional probabilities. A conditional probability is the probability of the occurrence of some event A, based on the occurrence of a different event B. Conditional probability can be defined by the following equation:

$$P(A \mid B) = \frac{P(A \cap B)}{P(B)}$$

where P(A|B) is read as "the probability of the event A, given the occurrence of the event B,"

P(A∩B) is read as "the probability of the events A and B both occurring," and

P(B) is simple the probability of the event B occurring regardless of whether or not the event A occurs.

Again, one example of a conditional probability is disclosed in the book "Probability: an introduction" by Samuel Goldberg-Page 74-76, Example 5.1. In general, the conditional probability example considers a club with four male and five female charter members that elects two women and three men to membership. From the total of 14 members, one person is selected at random, and suppose it is known that the person selected is a charter member. Now consider the question of what is the probability the person selected is male? In other words, given that we already know the person selected is a charter member, what is the probability the person selected at random is male? In terms of the conditional probability, B is the event "the person selected is a charter member," and A is the event "the person selected is male." According to the formula for conditional probability:

$$P(B) = 9/14, \text{ and}$$

$$P(A \cap B) = 7/14$$

Thus, the probability of the person selected at random is male given that the person selected is a charter member is:

$$P(A \mid B) = \frac{(A \cap B)}{P(B)} = \frac{7/14}{9/14} = \frac{7}{9}$$

Bayes' theorem relates the conditional probability of the event A given the event B to the probability of the event B given the event A. In other words, Bayes' theorem relates the conditional probabilities P(A|B) and P(B|A) in a single mathematical expression as follows:

$$P(A \mid B) = \frac{P(B \mid A) P(A)}{P(B)}$$

P(A) is a prior probability of the event A. It is called the "prior" because it does not take into account the occurrence of the event B. P(B|A) is the conditional probability of observing the event B given the observation of the event A. P(A|B) is the conditional probability of observing the event A given the observation of the event B. It is called the "posterior" because it depends from, or is observed after, the occurrence of the event B. P(B) is a prior probability of the event B, and can serve as a normalizing constant.

For an example application of Bayes' theorem consider two urns containing colored balls as specified in Table I:

TABLE I

| Urn | Red | Yellow | Blue |
|-----|-----|--------|------|
| 1 | 3 | 4 | 2 |
| 2 | 1 | 2 | 3 |

Suppose one of the urns is selected at random and a blue ball is removed. Bayes' theorem can be used to determine the probability the ball came from urn 1. Let B denote the event "ball selected is blue." To account for the occurrence of B there are two hypotheses: $A_1$ is the event urn 1 is selected, and $A_2$ is the event urn 2 is selected.

Because the urn is selected at random, $$P(A_1) = P(A_2) = 1/2$$

Based on the entries in Table I, conditional probabilities also give:

$$P(B|A_1) = 2/9, \text{ and}$$

$$P(B|A_2) = 3/6$$

The probability of the event "ball selected is blue," regardless of which urn is selected, is $$P(B) = P(B|A_1)P(A_1) + P(B|A_2)P(A_2) = (2/9)(1/2) + (3/6)(1/2) = (13/27)$$

Thus, according to Bayes' theorem, the probability the blue ball came from urn I is given by:

$$P(A_i|B) = \frac{P(B|A_1)P(A_1)}{P(B)} = \frac{(2/9)(1/2)}{13/27} = \frac{3}{13}$$

Template Parameters

In this subsection, template parameters used to obtain dimensions of image fields and white spaces of a document template are described with reference to just three example document templates. The three examples described below are not intended to be exhaustive of the nearly limitless possible dimensions and arrangements of template elements. Instead, the examples described in this subsection are intended to merely provide a basic understanding of how the dimensions of elements of a template can be characterized, and are intended to introduce the reader to the terminology and notation used to represent template parameters and dimensions of document templates. Note that template parameters are not used to change the dimensions of the text fields or the overall dimensions of the templates. Template parameters are formally determined using probabilistic methods and systems described below in the subsequent subsection.

In preparing a document layout, document designers typically select a style sheet in order to determine the document's overall appearance. The style sheet may include (1) a typeface, character size, and colors for headings, text, and background; (2) format for how front matter, such as preface, figure list, and title page should appear; (3) format for how sections can be arranged in terms of space and number of columns, line spacing, margin widths on all sides, and spacing between headings just to name a few; and (4) any boilerplate content included on certain pages, such as copyright statements. The style sheet typically applies to the entire document. As necessary, specific elements of the style sheet may be overridden for particular sections of the document.

Figure 3A:
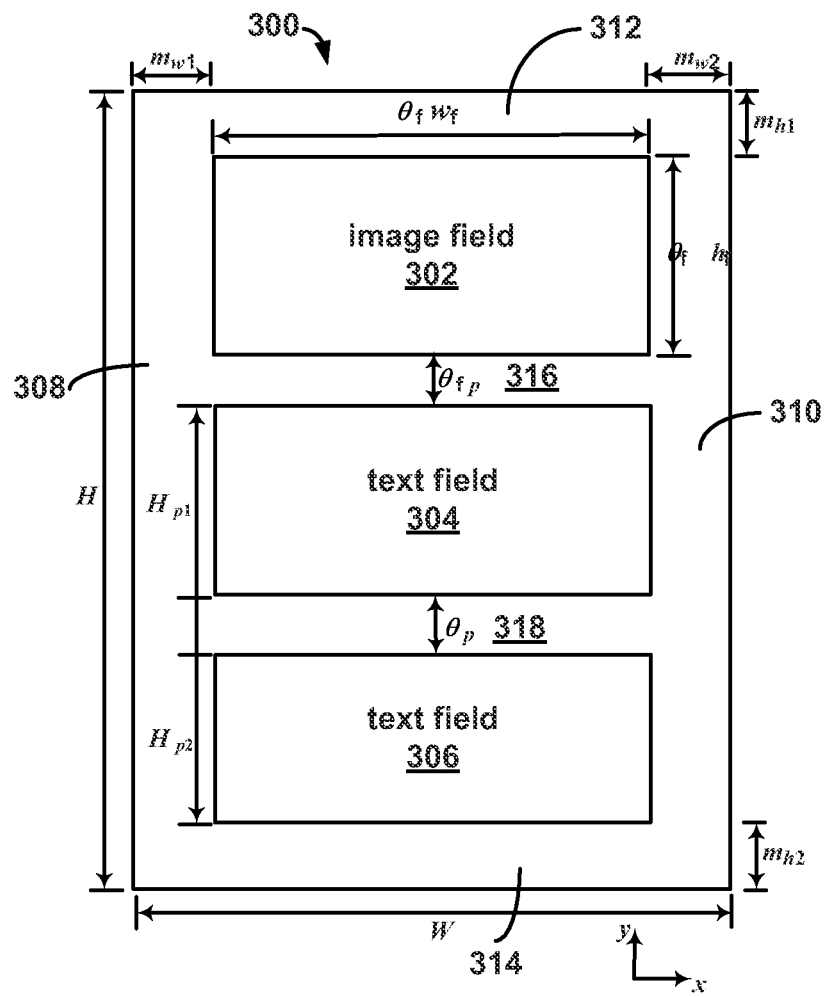
FIG. 3A shows a representation of a first single page template with dimensions identified in accordance with one example.

Document templates represent the arrangement elements for displaying text and images for each page of the document. FIG. 3A shows an example representation of a first single page template 300 with dimensions identified. Template 300 includes an image field 302, a first text field 304, and a second text field 306. The width and height of the template 300 are fixed values represented by constants W and H, respectively. Widths of margins 308 and 310, $m_{w1}$ and $m_{w2}$, extending in the y-direction are variable, and widths of top and bottom margins 312 and 314, $m_{h1}$ and $m_{h2}$, extending in the x-direction are variable. Note that templates may include a constraint on the minimum margin width below which the margins cannot be reduced. The dimensions of text fields 304 and 306 are also fixed with the heights denoted by $H_{p1}$ and $H_{p2}$, respectively. As illustrated in the example of FIG. 3A, the scaled height and width dimensions of an image placed in the image field 302 are represented by $\Theta_f h_f$ and $\Theta_f w_f$ respectively, where $h_f$ and $w_f$ represent the height and width of the image, and $\Theta_f$ is a single template parameter used to scale both the height $h_f$ and width $w_f$ of the image. Note that using a single scale factor $\Theta_f$ to adjust both the height and width of an image avoids image distortion, which is normally associated with adjusting the aspect ratio of an image in order to fit the image within an image field. FIG. 3A also includes a template parameter $\Theta_{fp}$ that scales the width of the white space 316, and a template parameter $\Theta_p$ that scales the width of the white space 318.

The template parameters and dimensions of an image and white space associated with the template 300 can be characterized by vectors as illustrated in FIG. 3B. The parameter vector $\vec{\Theta}$ includes three template parameters $\Theta_f$, $\Theta_{fp}$, and $\Theta_p$ associated with adjusting the dimensions of the image field 302 and the white spaces 316 and 318 and includes the variable margin values $m_{w1}$, $m_{w2}$, $m_{h1}$ and $m_{h2}$. Vector elements of vector $\vec{x}_1$ represent dimensions of the image displayed in the image field 302 and margins in the x-direction, and vector elements of vector $\vec{y}_1$ represent dimensions of the image, white spaces, and margins in the y-direction. The vector elements of the vectors $\vec{x}_1$ and $\vec{y}_1$ are selected to correspond to the template parameters of the parameter vector $\vec{\Theta}$ as follows.

Because both the width $w_f$ and the height $h_f$ of the image are scaled by the same parameter $\Theta_f$ as described above, the first vector elements of $\vec{x}_1$ and $\vec{y}_1$ are $w_f$ and $h_f$ respectively. The other dimensions varied in the template 300 are the widths of the white spaces 316 and 318, which are varied in the y-direction, and the margins which are varied in the x- and y-directions. For $\vec{x}_1$ the two vector elements corresponding to the parameters $\Theta_{fp}$ and $\Theta_p$ are "0", the two vector elements corresponding to the margins $m_{w1}$ and $m_{w2}$ are "1", and the two vector elements corresponding to the margins $m_{h1}$ and $m_{h2}$ are "0". For $\vec{y}_1$ the two vector elements corresponding to the parameters $\Theta_{fp}$ and $\Theta_p$ are "1", the two vector elements corresponding to the margins $m_{w1}$ and $m_{w2}$ are "0" and the two vector elements corresponding to the margins $m_{h1}$ and $m_{h2}$ are "1".

The vector elements of $\vec{x}_1$ and $\vec{y}_1$ are arranged to correspond to the parameters of the vector $\vec{\Theta}$ in order to satisfy the following condition in the x-direction:

$$\vec{\Theta}^T \vec{x}_1 - W_1 \approx 0$$

and the following condition in the y-direction:

$$\vec{\Theta}^T \vec{y}_1 - H_1 \approx 0$$

where $\vec{\Theta}^T \vec{x}_1 = \Theta_f w_f + m_{w1} + m_{w2}$ is the scaled width of the image displayed in the image field 302;

$W_1 = W$ is a variable corresponding to the space available to the image displayed in the image field 302 in the x-direction;

$\vec{\Theta}^T \vec{y}_1 = \Theta_f h_f + \Theta_{fp} + \Theta_p + m_{h1} + m_{h2}$ is the sum of the scaled height of the image displayed in the image field 302 and the parameters associated with scaling the white spaces 316 and 318; and $H_1 = H - H_{p1} - H_{p2}$ is a variable corresponding to the space available for the image displayed in the image field 302 and the widths of the white spaces 316 and 318 in the y-direction.

Probabilistic methods based on Bayes' theorem described below can be used to determine the template parameters so that the conditions $\vec{\Theta}^T \vec{x}_1 - W_1 \approx 0$ and $\vec{\Theta}^T \vec{y}_1 - H_1 \approx 0$ are satisfied.

Figure 4A:
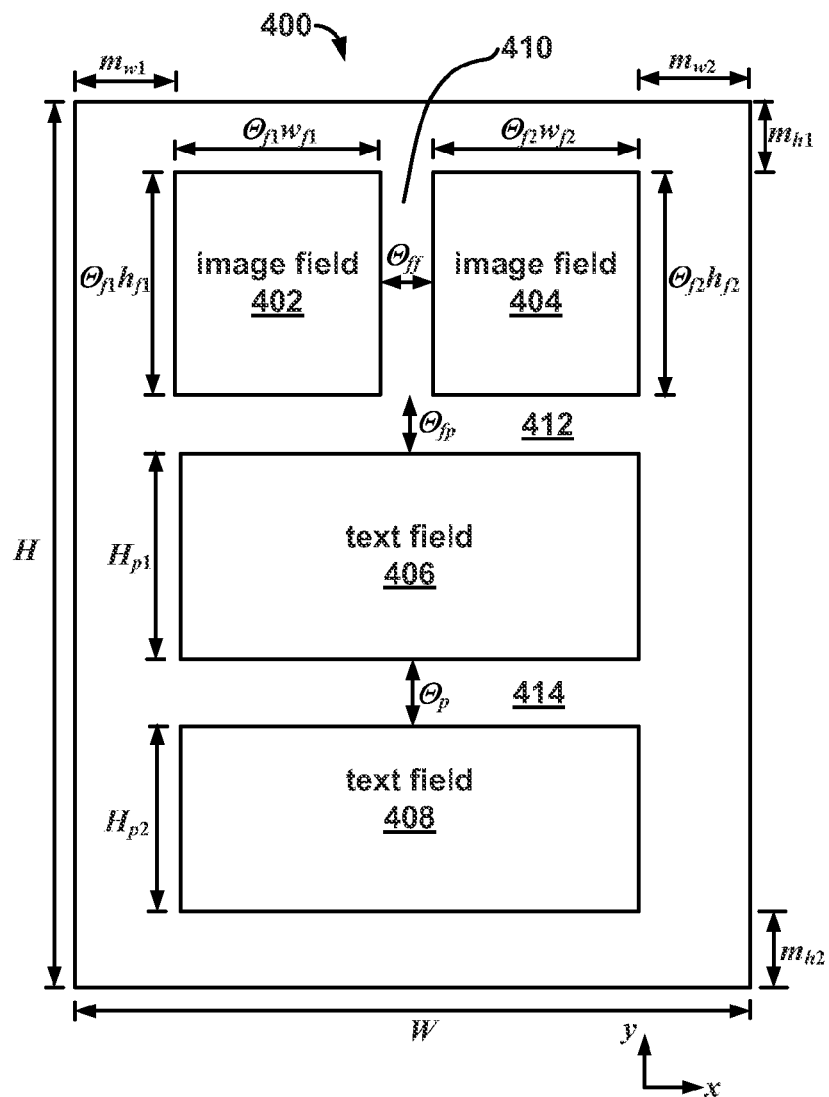
FIG. 4A shows a representation of a second single page template with dimensions identified in accordance with one example.

FIG. 4A shows an example representation of a second single page template 400 with dimensions identified. Template 400 includes a first image field 402, a second image field 404, a first text field 406, and a second text field 408. Like the template 300 described above, the template 400 width W and height H are fixed and side margins $m_{w1}$ and $m_{w2}$ extending in the y-direction and top and bottom margins $m_{h1}$ and $m_{h2}$ extending in the x-direction are variable but are subject to minimum value constraints. The dimensions of text fields 404 and 406 are also fixed with the heights denoted by $H_{p1}$ and $H_{p2}$, respectively. As illustrated in the example of FIG. 4A, the scaled height and width dimensions of an image placed in the image field 402 are represented by $\Theta_{f1} h_{f1}$ and $\Theta_{f1} w_{f1}$, respectively, where $h_{f1}$ and $w_{f1}$ represent the height and width of the image, and $\Theta_{f1}$ is a single template parameter used to scale both the height $h_{f1}$ and width $w_{f1}$ of the image. The scaled height and width dimensions of an image displayed in the image field 404 are represented by $\Theta_{f2} h_{f2}$ and $\Theta_{f2} w_{f2}$ respectively, where $h_{f2}$ and $w_{f2}$ represent the height and width of the image, and $\Theta_{f2}$ is a single template parameter used to scale both the height $h_{f2}$ and width $w_{f2}$ of the image. FIG. 4A also includes a template parameter that scales the width of the white space 410, a template parameter $\Theta_{fp}$ that scales the width of the white space 412, and a template parameter $\Theta_p$ that scales the width of the white space 414.

The template parameters and dimensions of images and white spaces associated with the template 400 can be characterized by vectors as illustrated in FIG. 4B. The parameter vector $\vec{\Theta}$ includes the five template parameters $\Theta_{f1}$, $\Theta_{f2}$, $\Theta_{ff}$, $\Theta_{fp}$, and $\Theta_p$ and the variable margin values $m_{w1}$, $m_{w2}$, $m_{h1}$, and $m_{h2}$. The changes to the template 400 in the x-direction are the widths of the images displayed in the image fields 402 and 404 and the width of the white space 410, which are characterized by a single vector $\vec{x}_1$. As illustrated in FIG. 4B, the first two vector elements of $\vec{x}_1$ are the widths $w_{f1}$ and $w_{f2}$ of the images displayed in the image fields 402 and 404 in the x-direction and correspond to the first two vector elements of the parameter vector $\vec{\Theta}$. The third vector element of $\vec{x}_1$ is "1" which accounts for the width of the white space 410 and corresponds to the third vector element of the parameter vector $\vec{\Theta}$. The fourth and fifth vector elements of $\vec{x}_1$ are "0" which correspond to the fourth and fifth the vector elements of $\vec{\Theta}$. The remaining four vector elements of $\vec{x}_1$ corresponding to the margins $m_{w1}$ and $m_{w2}$ are "1" and corresponding to the margins $m_{h1}$ and $m_{h2}$ are "0".

On the other hand, changes to the template 400 in the y-direction are characterized by two vectors $\vec{y}_1$ and $\vec{y}_2$ each vector accounting for changes in the height of two different images displayed in the image fields 402 and 404 and the white spaces 412 and 414. As illustrated in FIG. 4B, the first vector element of $\vec{y}_1$ is the height of the image displayed in the image field 402 and corresponds to the first vector element of the parameter vector $\vec{\Theta}$. The second vector element of $\vec{y}_2$ is the height of the image displayed in the image field 404 and corresponds to the second term of the parameter vector $\vec{\Theta}$. The fourth and fifth vector elements of $\vec{y}_1$ and $\vec{y}_2$ are "1" which account for the widths of the white spaces 412 and 414 and correspond to the fourth and fifth vector elements of the parameter vector $\vec{\Theta}$. The "0" vector elements of $\vec{y}_1$ and $\vec{y}_2$ correspond to the parameters that scale dimensions in the x-direction. The remaining four vector elements of $\vec{y}_1$ and $\vec{y}_2$ and corresponding to the margins $m_{w1}$ and $m_{w2}$ are "0" and corresponding to the margins $m_{h1}$ and $m_{h2}$ are "1".

As described above with reference to FIG. 4B, the vector elements of $\vec{x}_1$, $\vec{y}_1$ and $\vec{y}_2$ are arranged to correspond to the parameters of the vector $\vec{\Theta}$ to satisfy the following condition in the x-direction:

$$\vec{\Theta}^T \vec{x}_1 - W_1 \approx 0$$

and the following conditions in the y-direction:

$$\vec{\Theta}^T \vec{y}_1 - H_1 \approx 0$$

$$\vec{\Theta}^T \vec{y}_2 - H_2 \approx 0$$

where $\vec{\Theta}^T \vec{x}_1 = \Theta_{f1} w_{f1} + \Theta_{f2} w_{f2} + f_{ff} + m_{w1} + m_{w2}$ is the scaled width of the images displayed in the image fields 402 and 404' and the width of the white space 410;

$W_1 = W$ is a variable corresponding to the space available for the images displayed in the image fields 402 and 404 and the white space 410 in the x-direction;

$\vec{\Theta}^T \vec{y}_1 = \Theta_{f1} h_{f1} + \Theta_{fp} + \Theta_p + m_{h1} + m_{h2}$ is the sum of the scaled height of the image displayed in the image field 402 and the parameters associated with scaling the white spaces 412 and 414;

$\vec{\Theta}^T \vec{y}_2 = \Theta_{f2} h_{f2} + \Theta_{fp} + \Theta_p + m_{h1} + m_{h2}$ is the sum of the scaled height of the image displayed in the image field 404 and the parameters associated with scaling the white spaces 412 and 414, $H_1 = H - H_{p1} - H_{p2}$ is a first variable corresponding to the space available for the image displayed in the image field 402 and the widths of the white spaces 412 and 414 in the y-direction; and $H_2 = H_1$ is a second constant corresponding to the space available for the image displayed in the image field 404 and the widths of the white spaces 412 and 414 in the y-direction.

Probabilistic methods based on Bayes' theorem described below can be used to determine the template parameters so that the conditions $\vec{\Theta}^T \vec{x}_1 - W_1 \approx 0$, $\vec{\Theta}^T \vec{y}_1 - H_1 \approx 0$, and $\vec{\Theta}^T \vec{y}_2 - H_2 \approx 0$ are satisfied.

Figure 5A:
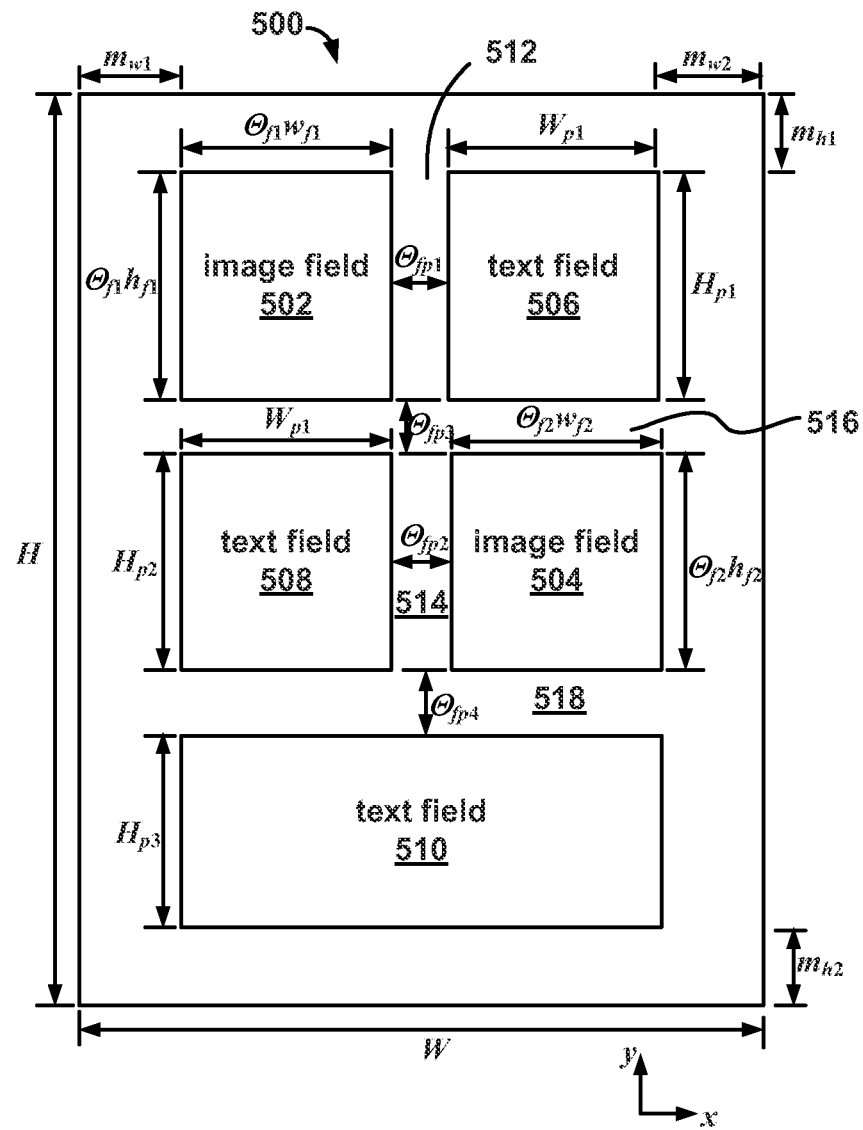
FIG. 5A shows a representation of a third single page template with dimensions identified in accordance with one example.

FIG. 5A shows an example representation of a single page template 500 with dimensions identified. Template 500 includes a first image field 502, a second image field 504, a first text field 506, a second text field 508, and a third text field 510. Like the templates 300 and 400 described above, the template width W and height H are fixed and side margins $m_{w1}$ and $m_{w2}$ extending in the y-direction and top and bottom margins $m_{h1}$ and $m_{h2}$ extending in the x-direction are variable, but are subject to minimum value constraints. The dimensions of text fields 506, 508, and 510 are also fixed with the heights denoted by $H_{p1}$, $H_{p2}$, and $H_{p3}$, respectively, and the widths of the text fields 506 and 508 denoted by $W_{p1}$ and $W_{p2}$, respectively. As illustrated in the example of FIG. 5A, the scaled height and width dimensions of an image displayed in the image field 502 are represented by $\Theta_{f1}h_{f1}$ and $\Theta_{f1}w_{f1}$, respectively, where $h_{f1}$ and $w_{f1}$ represent the height and width of the image, and $\Theta_{f1}$ is a single template parameter used to scale both the height $h_{f1}$ and width $w_{f1}$ of the image. The scaled height and width dimensions of an image displayed in the image field 504 are represented by $\Theta_{f2}h_{f2}$ and $\Theta_{f2}w_{f2}$ respectively, where $h_{f2}$ and $w_{f2}$ represent the height and width of the image, and $\Theta_{f2}$ is a single template parameter used to scale both the height $h_{f2}$ and width $w_{f2}$ of the image. FIG. 5A also includes a template parameter $\Theta_{fp1}$ that scales the width of the white space 512, a template parameter $\Theta_{fp2}$ that scales the width of the white space 514, a template parameter $\Theta_{fp3}$ that scales the width of the white space 516, and a template parameter $\Theta_{fp4}$ that scales the width of white space 518.

The template parameters and dimensions of images and white spaces associated with the template 500 can be characterized by vectors as illustrated in FIG. 5B. The parameter vector $\vec{\Theta}$ includes the six template parameters $\Theta_{f1}$, $\Theta_{fp1}$, $\Theta_{f2}$, $\Theta_{fp2}$, $\Theta_{fp3}$, and $\Theta_{fp4}$ and the variable margin values $m_{w1}$, $m_{w2}$, $m_{h1}$, and $m_{h2}$. The changes to the template 500 in the x-direction include the width of the image displayed in the image field 502 and the width of the white space 512, and separate changes in the width of the image displayed in the image field 504 and the width of the white space 514. These changes are characterized by vectors $\vec{x}_1$ and $\vec{x}_2$. As illustrated in FIG. 5B, the first vector element of $\vec{x}_1$ is the width $w_{f1}$ and the second vector element is "1" which correspond to first two vector elements of the parameter vector $\vec{\Theta}$. The third vector element of $\vec{x}_2$ is the width $w_{f2}$ and the fourth vector element is "1" which correspond to first third and fourth vector elements of the parameter vector $\vec{\Theta}$. The fifth and sixth vector elements of $\vec{x}_1$ and $\vec{x}_2$ corresponding to white spaces that scale dimensions in the y-direction are "0". The remaining four vector elements of $\vec{x}_1$ and $\vec{x}_2$ corresponding to the margins $m_{w1}$ and $m_{w2}$ are "1" and corresponding to the margins $m_{h1}$ and $m_{h2}$ are "0"

On the other hand, changes to the template 500 in the y-direction are also characterized by two vectors $\vec{y}_1$ and $\vec{y}_2$. As illustrated in FIG. 5B, the first vector element of $\vec{y}_1$ is the height of the image displayed in the image field 502 and corresponds to the first vector element of the parameter vector $\vec{\Theta}$. The third vector element of $\vec{y}_2$ is the height of the image displayed in the image field 504 and corresponds to the third term of the parameter vector $\vec{\Theta}$. The fifth and sixth vector elements of $\vec{y}_1$ and $\vec{y}_2$ are "1" which account for the widths of the white spaces 516 and 518 and correspond to the fifth and sixth vector elements of the parameter vector $\vec{\Theta}$. The vector elements of $\vec{y}_1$ and $\vec{y}_2$ corresponding to white space that scale in the x-direction are "0". The remaining four vector elements of $\vec{y}_1$ and $\vec{y}_2$ corresponding to the margins $m_{w1}$ and $m_{w2}$ are "0" and corresponding to the margins $m_{h1}$ and $m_{h2}$ are "1".

As described above with reference to FIG. 5B, the vector elements of $\vec{x}_1$, $\vec{x}_2$, $\vec{y}_1$, and $\vec{y}_2$ are arranged to correspond to the parameters of the vector $\vec{\Theta}$ in order to satisfy the following conditions in the x-direction:

$$\vec{\Theta}^T\vec{x}_1 - W_1 \approx 0$$

$$\vec{\Theta}^T\vec{x}_2 - W_2 \approx 0$$

and satisfy the following conditions in the y-direction:

$$\vec{\Theta}^T\vec{y}_1 - H_1 \approx 0$$

$$\vec{\Theta}^T\vec{y}_2 - H_2 \approx 0$$

where $\vec{\Theta}^T\vec{x}_1 = \Theta_{f1}w_{f1} + \Theta_{fp1} + m_{w1} + m_{w2}$ is the scaled width of the images displayed in the image fields 502 and the width of the white space 512;

$W_1 = W - W_{p1}$ is a first variable corresponding to the space available for displaying an image into the image field 502 and the width of the white space 512 in the x-direction;

$\vec{\Theta}^T\vec{x}_2 = \Theta_{f2}w_{f2} + \Theta_{fp2} + m_{w1} + m_{w2}$ is the scaled width of the image displayed in the image field 504 and the width of the white space 514;

$W_2 = W - W_{p2}$ is a second variable corresponding to the space available for displaying an image into the image field 504 and width of the white space 514 in the x-direction;

$\vec{\Theta}^T\vec{y}_1 = \Theta_{f1}h_{f1} + \Theta_{fp3} + \Theta_{fp4} + m_{h1} + m_{h2}$ is the sum of the scaled height of the image displayed in the image field 402 and the parameters associated with scaling the white spaces 412 and 414;

$H_1 = H - H_{p2} - H_{p3}$ is a first constant corresponding to the space available to the height of the image displayed in image field 502 and the widths of the white spaces 516 and 518 in the y-direction;

$\vec{\Theta}^T\vec{y}_2 = \Theta_{f2}h_{f2} + \Theta_{fp3} + \Theta_{fp4}m_{h1} + m_{h2}$ is the sum of the scaled height of the image displayed in the image field 404 and the parameters associated with scaling the white spaces 412 and 414; and $H_2 = H - H_{p1} - H_{p3}$ is a second constant corresponding to the space available to the height of the image displayed in image field 504 and the widths of the white spaces 516 and 518 in the y-direction.

Probabilistic methods based on Bayes' theorem described below can be used to determine the template parameters so that the conditions $\vec{\Theta}^T\vec{x}_1 - W_1 \approx 0$, $\vec{\Theta}^T\vec{x}_2 - W_2 \approx 0$, $\vec{\Theta}^T\vec{y}_1 - H_1 \approx 0$, and $\vec{\Theta}^T\vec{y}_2 - H_2 \approx 0$ are satisfied.

Note that the templates 300, 400, and 500 are examples representing how the number of constants associated with the space available in the x-direction $W_i$ and corresponding vectors $\vec{x}_i$, and the number of constants associated with the space available in the y-direction $H_j$ and corresponding vectors $\vec{y}_j$, can be determined by the number of image fields and how the image fields are arranged within the template. For example, for the template 300, illustrated in FIGS. 3A-3B, the template 300 is structured with a single image field resulting in a single constant $W_1$ and corresponding vector $\vec{x}_1$ and a single constant $H_1$ and corresponding vector $\vec{y}_1$. However, when the number of image fields exceeds one, the arrangement of image fields can create more that one row and/or column, and thus, the number of constants representing the space available in the x- and y-directions can be different, depending on how the image fields are arranged. For example, for the template 400, illustrated in FIGS. 4A-4B, the image fields 402 and 404 create a single row in the x-direction so that the space available for adjusting the images placed in the image fields 402 and 404 in the x-direction can be accounted for with a single constant $W_1$ and the widths of the images and white space 410 can be accounted for in a single associated vector $\vec{x}_1$.

On the other hand, as illustrated in FIG. 4A, the image fields 402 and 404 also create two different columns in the y-direction. Thus, the space available for separately adjusting the images placed in the image fields 402 and 404 in the y-direction can be accounted for with two different constants $H_1$ and $H_2$ and associated vectors $\vec{y}_1$ and $\vec{y}_2$. The template 500, illustrated in FIGS. 5A-5B, represents a case where the image fields 502 and 504 create two different rows in the x-direction and two different columns in the y-direction. Thus, in the x-direction, the space available for separately adjusting the images placed in the image fields 502 and 504 and the white spaces 512 and 514 can be accounted for with two different constants $W_1$ and $W_2$ and associated vectors $\vec{x}_1$ and $\vec{x}_2$ and in the y-direction, the space available for separately adjusting the same images and the white spaces 516 and 516 can be accounted for with two different constants $H_1$ and $H_2$ and associated vectors $\vec{y}_1$ and $\vec{y}_2$.

In summary, a template is defined for a given number of images. In particular, for a template structured with m rows and n columns of image fields, there are $W_1, W_2, \ldots W_m$ constants and corresponding vectors $\vec{x}_1, \vec{x}_2, \ldots \vec{x}_m$ associated with the m rows, and there are $H_1, H_2, \ldots H_n$ constants and corresponding vectors $\vec{y}_1, \vec{y}_2, \ldots \vec{y}_n$ associated with the n columns.

Probabilistic Methods and Systems for Determining Document Template Parameters

Methods can be used to prepare each page template of a mixed-content document layout. The methods are based on probabilistic template models that provide a probabilistic description of element dimensions for each page template. In particular, each template of a mixed-content document layout has an associated probabilistic description of element dimensions. In other words, element dimensions, such as height and width, have an associated uncertainty that can be selected based on prior probability distributions. Methods are based on the assumption that when one observes specific elements to be arranged within a template, template parameters can be determined and used to scale the dimensions of the elements within the template where certain template parameters are more likely to be observed than others.

Methods can be used to obtain a closed form description of the parameter vector $\vec{\Theta}$. This closed form description can be obtained by considering the relationship between dimensions of elements of a template with m rows of image fields and n columns of image fields and the corresponding parameter vector $\vec{\Theta}$ in terms of Bayes' Theorem from probability theory as follows:

$$P(\vec{\Theta}|\vec{W},\vec{H},\vec{x},\vec{y}) \propto P(\vec{W},\vec{H},\vec{x},\vec{y}|\vec{\Theta})$$ Equation (1):

where
$\vec{W}=[W_1, W_2, \ldots W_m]^T$,
$\vec{H}=[H_1, H_2, \ldots H_n]^T$,
$\vec{x}=[\vec{x}_1, \vec{x}_2, \ldots \vec{x}_m]^T$,
$\vec{y}=[\vec{y}_1, \vec{y}_2, \ldots \vec{y}_m]^T$,
the exponent T represents the transpose from matrix theory.

Vector notation is used to succinctly represent template constants $W_i$ and corresponding vectors $\vec{x}_i$ associated with the m rows and template constants $H_j$ and corresponding vectors $\vec{y}_j$ associated with the n columns of the template.

Equation (1) is in the form of Bayes' Theorem but with the normalizing probability $P(\vec{W}, \vec{H}, \vec{x}, \vec{y})$ excluded from the denominator of the right-hand side of equation (1) (e.g., see the definition of Bayes' Theorem provided in the subsection titled An Overview of Bayes' Theorem and Related Concepts from Probability Theory). As demonstrated below, the normalizing probability $P(\vec{W}, \vec{H}, \vec{x}, \vec{y})$ does not contribute to determining the template parameters $\vec{\Theta}$ that maximize the posterior probability $P(\vec{\Theta}|\vec{W}, \vec{H}, \vec{x}, \vec{y})$ and for this reason $P(\vec{W}, \vec{H}, \vec{x}, \vec{y})$ can be excluded from the denominator of the right-hand side of equation (1).

In equation (1), the term $P(\vec{\Theta})$ is the prior probability associated with the parameter vector $\vec{\Theta}$ and does not take into account the occurrence of an event composed of $\vec{W}, \vec{H}, \vec{x}, \vec{y}$. In certain examples, the prior probability can be characterized by a normal, or Gaussian, probability distribution given by:

$$P(\vec{\Theta}) \approx N(\vec{\Theta}|\vec{\Theta}_1, \Lambda_1^{-1})N(\vec{\Theta}|\vec{\Theta}_2, \Lambda_2^{-1}) \propto \exp((\vec{\Theta}_1-\vec{\Theta})^T\Lambda_1/2(\vec{\Theta}_1-\vec{\Theta}))\exp((\vec{\Theta}_2-\vec{\Theta})^T\Lambda_2/2(\vec{\Theta}_2-\vec{\Theta}))$$

where
$\vec{\Theta}_1$ is a vector composed of independent mean values for the parameters set by a document designer;
$\Lambda_1$ is a diagonal matrix of variances for the independent parameters set by the document designer;
$\Lambda_2 = C^T\Delta^T\Delta C$ is a non-diagonal covariance matrix for dependent parameters; and
$\vec{\Theta}_2 = \Lambda^{-1}C^T\Delta^T\Delta\vec{d}$ is a vector composed of dependent mean values for the parameters.

The matrix C and the vector $\vec{d}$ characterize the linear relationships between the parameters of the parameter vector $\vec{\Theta}$ given by $C\vec{\Theta}=\vec{d}$ and $\vec{\Theta}$ is a covariance precision matrix. For example, consider the template 300 described above with reference to FIGS. 3A-3B. Suppose hypothetically the parameters of the parameter vector $\vec{\Theta}$ represented in FIG. 3B are linearly related by the following equations:

$0.2\Theta_f + 3.1\Theta_p \approx -1.4$, and $1.8\Theta_f - 0.7\Theta_p + 1.1\Theta_p \approx 3.1$ Thus, in matrix notation, these two equations can be represented as follows:

$$C\vec{\Theta} = \begin{bmatrix} 0.2 & 0 & 3.1 \\ 1.8 & -0.7 & 1.1 \end{bmatrix} \begin{bmatrix} \Theta_f \\ \Theta_{fp} \\ \Theta_p \end{bmatrix} \approx \begin{bmatrix} -1.4 \\ 3.1 \end{bmatrix} = \vec{d}$$

Returning to equation (1), the term $P(\vec{W}, \vec{H}, \vec{x}, \vec{y}|\vec{\Theta})$ is the conditional probability of an event composed of $\vec{W}, \vec{H}, \vec{x}$, and $\vec{y}$, given the occurrence of the parameters of the parameter vector $\vec{\Theta}$. In certain examples, the term $P(\vec{W}, \vec{H}, \vec{x}, \vec{y}|\vec{\Theta})$ can be characterized as follows:

$$P(\vec{W}, \vec{H}, \vec{x}, \vec{y} | \vec{\Theta}) \propto \prod_i \prod_j N\left(W_i \middle| \vec{\Theta}^T \vec{x}_i, \alpha_i^{-1}\right) N\left(H_j \middle| \vec{\Theta}^T \vec{y}_j, \beta_j^{-1}\right) \quad \text{Equation(2)}$$

where $$N\left(W_i \middle| \vec{\Theta}^T \vec{x}_i, \alpha_i^{-1}\right) \propto \exp\left(-\frac{\alpha_i}{2}\left(\vec{\Theta}^T \vec{x}_i - W_i\right)^2\right), \text{ and}$$

$$N\left(H_j \middle| \vec{\Theta}^T \vec{y}_j, \beta_j^{-1}\right) \propto \exp\left(-\frac{\beta_j}{2}\left(\vec{\Theta}^T \vec{y}_j - H_j\right)^2\right).$$

are normal probability distributions. The variables $\alpha_i^{-1}$ and $\beta_j^{-1}$ are variances and $W_i$ and $H_j$ represent mean values for the distributions $N(W_i|\vec{\Theta}^T\vec{x}_i, \alpha_i^{-1})$ and $N(H_j|\vec{\Theta}^T\vec{y}_j, \beta_j^{-1})$, respectively. Normal distributions can be used to characterize, at least approximately, the probability distribution of a variable that tends to cluster around the mean. In other words, variables close to the mean are more likely to occur than are variables farther from the mean. The normal distributions $N(W_i|\vec{\Theta}^T\vec{x}_i, \alpha_i^{-1})$ and $N(H_j|\vec{\Theta}^T\vec{y}, \beta_j^{-1})$ characterize the probability distributions of the variables $W_i$ and $H_j$ about the mean values $\vec{\Theta}^T\vec{x}_i$ and $\vec{\Theta}^T\vec{y}_j$ respectively.

Figure 6:
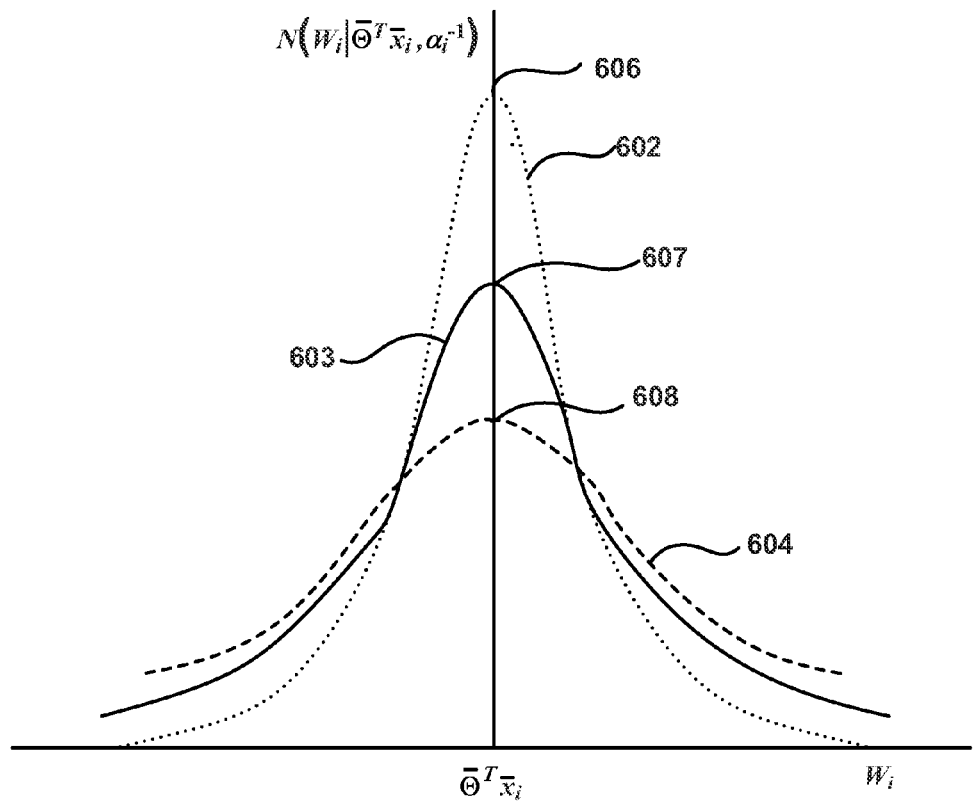
FIG. 6 shows a plot of a normal distribution for three different variances in accordance with one example.

For the sake of discussion, consider just the distribution $N(W_i|\vec{\Theta}^T\vec{x}_i, \alpha_i^{-1})$ FIG. 6 shows example plots of $N(W_i|\vec{\Theta}^T\vec{x}_i, \alpha_i^{-1})$ represented by curves 602-604, each curve representing the normal distribution $N(W_i|\vec{\Theta}^T\vec{x}_i, \alpha_i^{-1})$ for three different values of the variance $\alpha_i^{-1}$. Comparing curves 602-604 reveals that curve 602 has the smallest variance and the narrowest distribution about $\vec{\Theta}^T\vec{x}_i$, curve 604 has the largest variance and the broadest distribution about $\vec{\Theta}^T\vec{x}_i$, and curve 603 has an intermediate variance and an intermediate distribution about $\vec{\Theta}^T\vec{x}_i$. In other words, the larger the variance $\alpha_i^{-1}$ the broader the distribution $N(W_i|\vec{\Theta}^T\vec{x}_i, \alpha_i^{-1})$ about $\vec{\Theta}^T\vec{x}_i$, and the smaller the variance $\alpha_i^{-1}$ the narrower the distribution $N(W_i|\vec{\Theta}^T\vec{x}_i, \alpha_i^{-1})$ about $\vec{\Theta}^T\vec{x}_i$. Note that all three curves 602-604 also have corresponding maxima 606-608 centered about $\vec{\Theta}^T\vec{x}_i$. Thus, when $\vec{\Theta}^T\vec{x}_i$ equals $W_i$ (i.e., $\vec{\Theta}^T\vec{x}_i - W_i = 0$), the normal distribution $N(W_i|\vec{\Theta}^T\vec{x}_i, \alpha_i^{-1})$ is at a maximum value. The same observations can also be made for the normal distributions $N(H_j|\vec{\Theta}^T\vec{y}_j, \beta_j^{-1})$.

The posterior probability $P(\vec{\Theta}|\vec{W}, \vec{H}, \vec{x}, \vec{y})$ can be maximized when the exponents of the normal distributions of equation (2) satisfy the following conditions:

$$\vec{\Theta}^T\vec{x}_i - W_i \approx 0 \text{ and } \vec{\Theta}^T\vec{y}_j - H_j \approx 0$$

for all i and j. As described above, for a template, $W_i$ and $H_j$ are constants and the elements of $\vec{x}_i$ and $\vec{y}_j$ are constants. These conditions are satisfied by determining a parameter vector $\vec{\Theta}^{MAP}$ that maximizes the posterior probability $P(\vec{\Theta}|\vec{W}, \vec{H}, \vec{x}, \vec{y})$. The parameter vector $\vec{\Theta}^{MAP}$ can be determined by rewriting the posterior probability $P(\vec{\Theta}|\vec{W}, \vec{H}, \vec{x}, \vec{y}))$ as a multi-variate normal distribution with a well characterized mean and variance as follows:

$$P(\vec{\Theta}|\vec{W}, \vec{H}, \vec{x}, \vec{y}) = N\left(\vec{\Theta} \middle| \vec{\Theta}^{MAP}, \left(\Lambda + \sum_i \alpha_i \vec{x}_i \vec{x}_i^T + \sum_j \beta_j \vec{y}_j \vec{y}_j^T\right)^{-1}\right)$$

The parameter vector $\vec{\Theta}^{MAP}$ is the mean of the normal distribution characterization of the posterior probability $P(\vec{\Theta}|\vec{W}, \vec{H}, \vec{x}, \vec{y})$ and $\vec{\Theta}$ maximizes $P(\vec{\Theta}|\vec{W}, \vec{H}, \vec{x}, \vec{y})$ when $\vec{\Theta}$ equals $\vec{\Theta}^{MAP}$. Solving $P(\vec{\Theta}|\vec{W}, \vec{H}, \vec{x}, \vec{y})$ for $\vec{\Theta}^{MAP}$ gives the following closed form expression:

$$\vec{\Theta}^{MAP} = \left(\Lambda + \sum_i \alpha_i \vec{x}_i \vec{x}_i^T + \sum_j \beta_j \vec{y}_j \vec{y}_j^T\right)^{-1} \left(\Lambda \vec{\Theta} + \sum_i \alpha_i W_i \vec{x}_i + \sum_j \beta_j H_j \vec{y}_j\right)$$

The parameter vector $\vec{\Theta}^{MAP}$ can also be rewritten in matrix from as follows:

$$\vec{\Theta}^{MAP} = A^{-1} \vec{b}$$

where $$A = \Lambda + \sum_i \alpha_i \vec{x}_i \vec{x}_i^T + \sum_j \beta_j \vec{y}_j \vec{y}_j^T$$

is a matrix and $A^{-1}$ is the inverse of A, and $$\vec{b} = \Lambda \vec{\Theta} + \sum_i \alpha_i W_i \vec{x}_i + \sum_j \beta_j H_j \vec{y}_j$$

is a vector.

In summary, given a single page template and images to be placed in the image fields of the template, the parameters used to scale the images and white spaces of the template can be determined from the closed form equation for $\vec{\Theta}^{MAP}$.

Figure 7A:
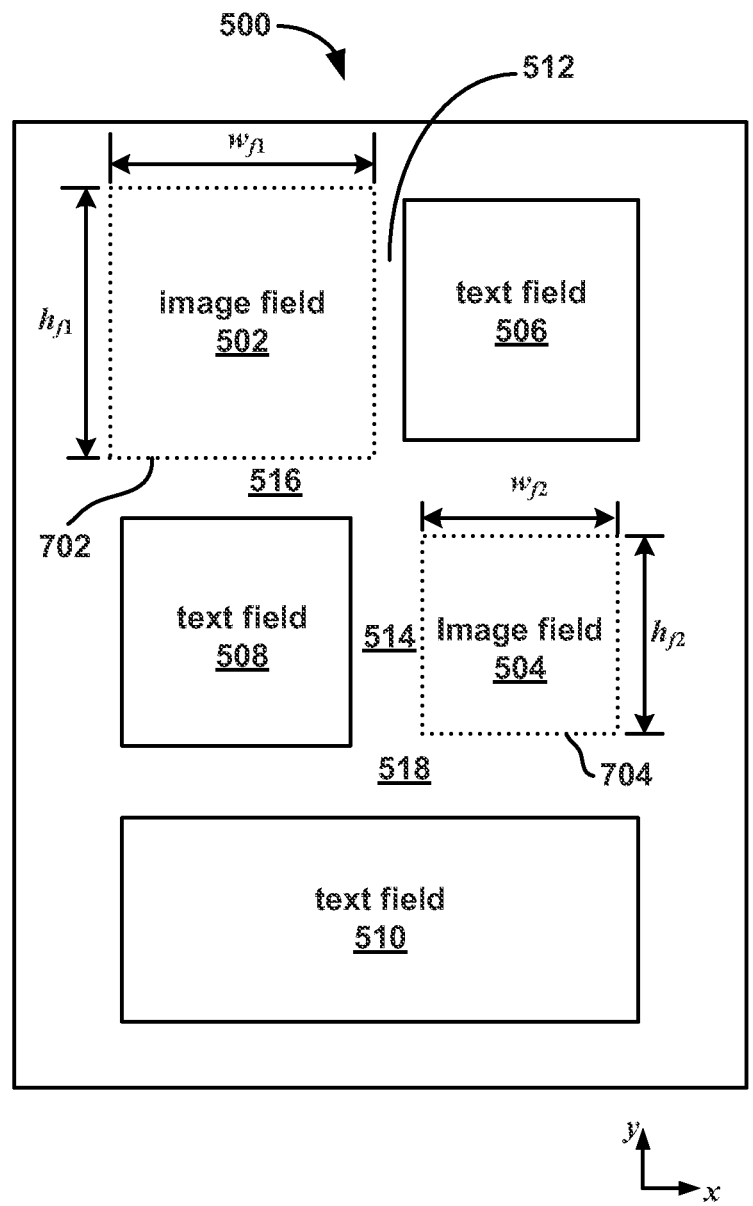
FIG. 7A shows a template structured in accordance with one example.

For a hypothetical example of applying the closed form parameter vector $\vec{\Theta}^{MAP}$ to rescale image, white space, and margin dimensions of a template, consider the single page template 500, illustrated in FIG. 5A, which is reproduced in FIG. 7A. Dotted-line rectangle 702 represents boundaries of a first unsealed image to be placed in image field 502 with height $h_{f1}$ and width $w_{f1}$, and dotted-line rectangle 704 represents boundaries of a second unsealed image to be placed in image field 504 with height $h_{f2}$ and width $w_{f2}$. The dimensions of the text fields 506, 508 and 510 remain fixed and the document designer can adjust the font, character size, and line spacing accordingly in order to fit the appropriate text into each of the text fields 506, 508, and 510. Based on the vectors illustrated in FIG. 5B, the closed form expression for determining the parameters of the parameter vector $\vec{\Theta}^{MAP}$ has the following general form:

$$\vec{\Theta}^{MAP} = \left(\Lambda + \sum_{i=1}^{2} \alpha_i \vec{x}_i \vec{x}_i^T + \sum_{j=1}^{2} \beta_j \vec{y}_j \vec{y}_j^T\right)^{-1} \left(\Lambda\vec{\Theta} + \sum_{i=1}^{2} \alpha_i W_i \vec{x}_i + \sum_{j=1}^{2} \beta_j H_j \vec{y}_j\right)$$

where the document designer selects appropriate values for the variances all, $\vec{\alpha}_1$, $\vec{\alpha}_2$, $\vec{\beta}_1$, and $\vec{\beta}_2$. The constants $W_1$, $W_2$, $H_1$, and $H_2$ and the vectors $\vec{x}_1$, $\vec{x}_2$, $\vec{y}_1$, and $\vec{y}_2$ are determined as described above with reference to FIG. 5B. In certain examples, values for the matrix $\Lambda$ and the vector $\vec{\Theta}$ can be determined by the linear relationships between the parameters of $\vec{\Theta}^{MAP}$ represented in the matrix C described above. In other examples, values for the matrix $\Lambda$ and the vector $\vec{\Theta}$ can be set by the document designer without regard to any relationship represented by the matrix C.

Once the parameters of the parameter vector $\vec{\Theta}^{MAP}$ are determined using the closed form equation for $\vec{\Theta}^{MAP}$, the template is rendered by multiplying un-scaled dimensions of the images and widths of the white spaces by corresponding parameters of the parameter vector $\vec{\Theta}^{MAP}$.

Figure 7B:
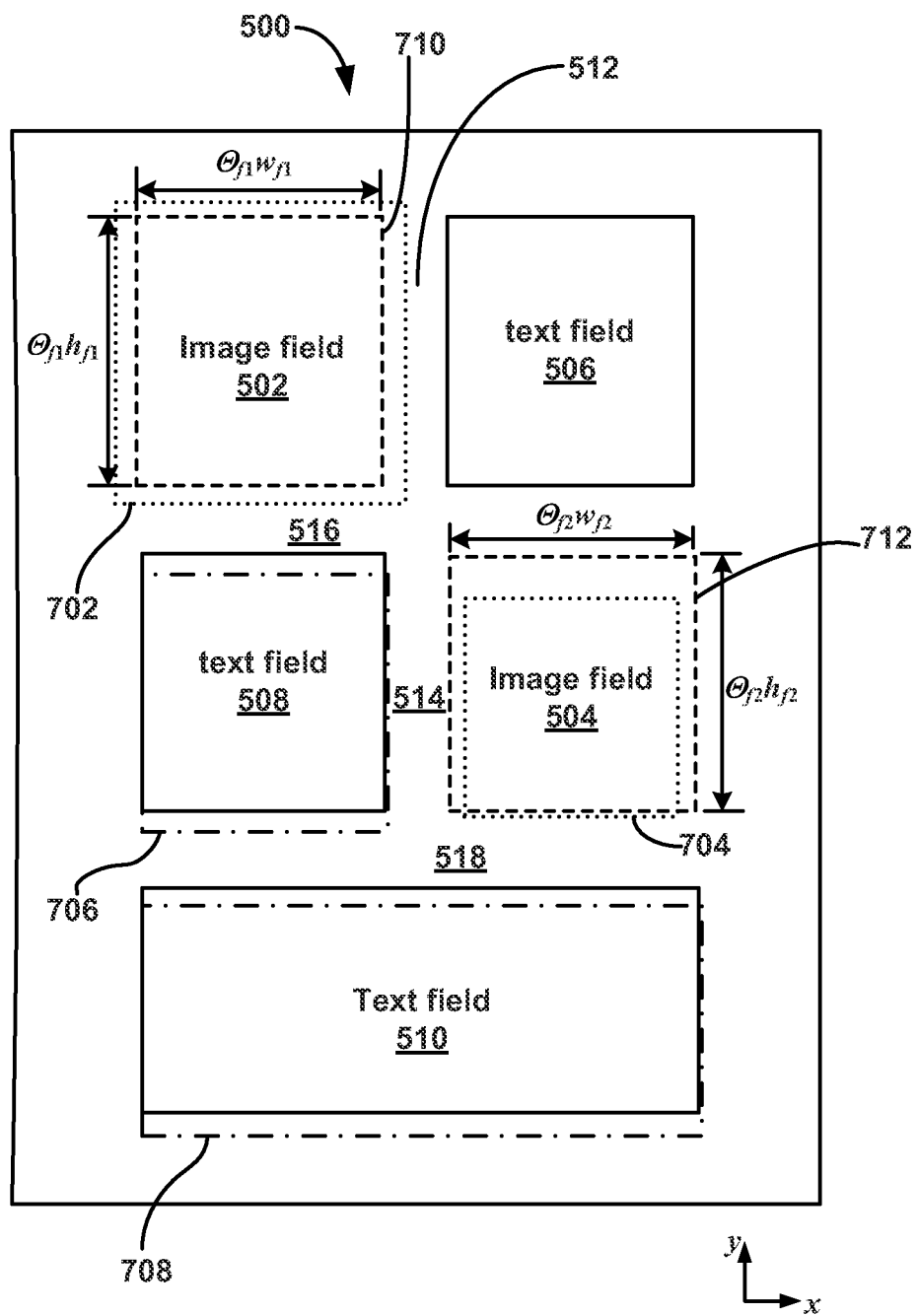
FIG. 7B shows a hypothetical rescaled version of the images and white spaces of the example template illustrated in FIG. 7A in accordance with one example.

FIG. 7B shows an example of a hypothetical rescaled version of the images and white spaces of the template 500 illustrated in FIG. 7A. Dot-dash-Line boxes 706 and 708 represent the initial positions of the text fields 508 and 510, respectively, illustrated in FIG. 7A, prior to rescaling. After determining values for the elements of the vector $\vec{\Theta}^{MAP}$, the white spaces 516 and 518 are rescaled resulting in a repositioning of the text fields 508 and 510. The image with initial boundaries 702 is rescaled by the parameter $\vec{\Theta}_{f1}$, in order to obtain a rescaled image with boundaries represented by dashed-line box 710, and the image with initial boundaries 704 is rescaled by the parameter $\vec{\Theta}_{f2}$ in order to obtain a rescaled image with boundaries represented by dashed-line box 712.

The elements of the parameter vector $\vec{\Theta}^{MAP}$ may also be subject to boundary conditions on the image fields and white space dimensions arising from the minimum width constraints for the margins. In other examples, in order to determine $\vec{\Theta}^{MAP}$ subject to boundary conditions, the vectors and $\vec{x}_1$, $\vec{x}_2$ $\vec{y}_1$, and $\vec{y}_2$ the variances $\alpha_1^{-1}$, $\alpha_2^{-1}$, $\beta_1^{-1}$, and $\beta_2^{-1}$ and the constants $W_1$, $W_2$, $H_1$, and $H_2$, are inserted into the linear equation $A\vec{\Theta}^{MAP}=\vec{b}$ and the matrix equation solved numerically for the parameter vector $\vec{\Theta}^{MAP}$ subject to the boundary conditions on the parameters of $\vec{\Theta}^{MAP}$. The matrix equation $A\vec{\Theta}^{MAP}=\vec{b}$ can be solved using any numerical method for solving matrix equations subject to boundary conditions on the vector $\vec{\Theta}^{MAP}$, such as the conjugate gradient method.

Figure 8:
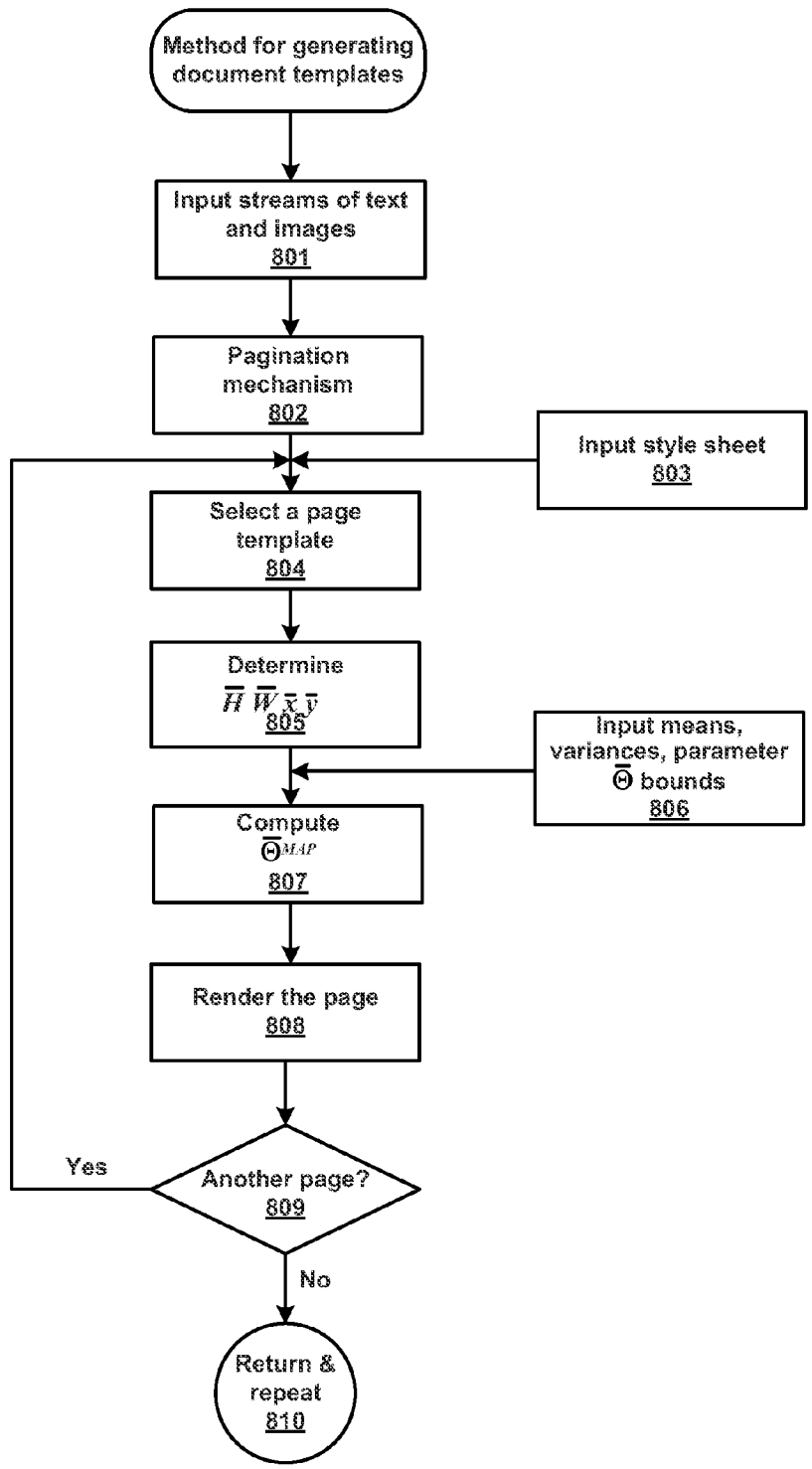
FIG. 8 shows a control-flow diagram of a method for generating document templates in accordance with one example.

FIG. 8 shows a control-flow diagram of an example method for generating document templates. Examples are not limited to the specific order in which the following blocks are presented. In other examples, the order in which the blocks are performed can be changed without deviating from the scope of examples described herein.

In block 801, streams of text and associated image data are input. In block 802, pagination is performed to determine the content for each page of the document. In block 803, a style sheet can selected for the templates of the document, as described in the subsection titled Template Parameters. The style sheet parameters can be used for each page of the document. In block 804, a template for a page of the document is selected, such as the example document templates described about the subsection title Template Parameters. A template can be selected based on a number of different criteria. For example, the document designer can be presented with a variety of different templates to choose from and the document designer selects the template. In other examples, the template can be selected so that the text describing the contents of each image appear on the same page as the image or appear on the subsequent or preceding page of the document.

In block 805, elements of the vectors $\vec{W}$, $\vec{H}$, $\vec{x}$, and $\vec{y}$ are determined as described in the subsection Template Parameters. In block 803, mean values corresponding to the widths $W_i$ and $H_j$, the variances $\alpha_i^{-1}$ and $\beta_j^{-1}$, and bounds for the parameters of the parameter vector $\vec{\Theta}$ are input. In block 807, the parameter vector $\vec{\Theta}^{MAP}$ that maximizes the posterior probability $P(\vec{\Theta}|\vec{W}, \vec{H}, \vec{x}, \vec{y})$ is determined as described above. Elements of the parameter vector $\vec{\Theta}^{MAP}$ can be determined by solving the matrix equation $A\vec{\Theta}^{MAP}=\vec{b}$ for $\vec{\Theta}^{MAP}$ using the conjugate gradient method or any other matrix equation solvers where the elements of the vector $\vec{\Theta}^{MAP}$ are subject to boundary conditions, such as minimum constraints placed on the margins. In block 808, once the parameter vector $\vec{\Theta}^{MAP}$ is determined, rescaled dimensions of the images and widths of the white spaces can be obtained by multiplying dimensions of the template elements by the corresponding parameters of the parameter vector $\vec{\Theta}^{MAP}$. The template page can then be rendered with the images and text placed in appropriate image and text fields. The template page can be rendered by displaying the page on monitor, television set, or any other suitable display, or the template page can be rendered by printing the page on a sheet of paper of an appropriate size. In block 809, when another page of the document is to be prepared, blocks 804, 805, 807, and 808 are repeated. Otherwise, the method proceeds to block 810 where a second document can be prepared by repeating blocks 801-809.

Computer System

Figure 9:
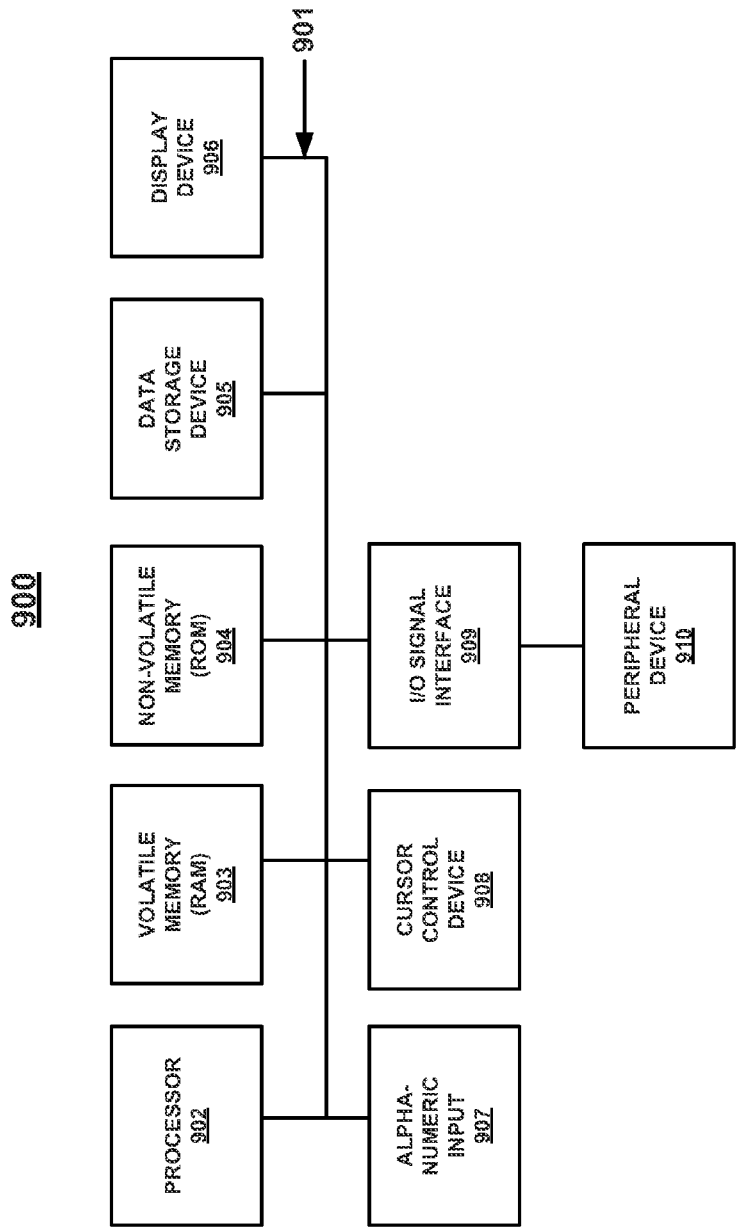
FIG. 9 shows a schematic representation of a computing device structured in accordance with one example.

With reference to FIG. 9, certain portions are comprised of computer-readable and computer-executable instructions that reside, for example, in computer system 900 which is used as a part of a general purpose computer network (not shown). It is appreciated that computer system 900 of FIG. 9 is an example and that the systems and methods disclosed herein can operate within a number of different computer systems including general-purpose computer systems, embedded computer systems, laptop computer systems, hand-held computer systems, and stand-alone computer systems.

In this example, computer system 900 includes an address/data bus 901 for conveying digital information between the various components, at least one central processor unit (CPU) 902 for processing the digital information and instructions, a volatile main memory 903 comprised of volatile random access memory (RAM) for storing the digital information and instructions, and a non-volatile read only memory (ROM)

904 for storing information and instructions of a more permanent nature. In addition, computer system 900 may also include a data storage device 905 (e.g., a magnetic, optical, flash, floppy, tape drive or the like) for storing vast amounts of data. It should be noted that the software program for creating an editable template from a document image can be stored either in volatile memory 903, data storage device 905, or in an external storage device (not shown).

Devices which can be coupled to computer system 900 include a display device 906 for displaying information to a computer user, an alpha-numeric input device 907 (e.g., a keyboard), and a cursor control device 908 (e.g., mouse, trackball, light pen, etc.) for inputting data, selections, updates, etc. Computer system 900 can also include a mechanism for emitting an audible signal (not shown). In addition, the display device 906 and alpha-numeric input device 907 may be combined such as a touch screen, capacitive sensor, or other type of interactive display capable of receiving user input.

Returning still to FIG. 9, examples of display device 906 of FIG. 9 may be a liquid crystal device, cathode ray tube, or other display device suitable for creating graphic images and alpha-numeric characters recognizable to a user. A cursor control device 908 allows the computer user to dynamically signal the two dimensional movement of a visible symbol (cursor) on a display screen of display device 906. Examples of cursor control device 908 include a trackball, mouse, touch pad, joystick, or special keys on alpha-numeric input 907 capable of signaling movement of a given direction or manner displacement. Alternatively, it will be appreciated that a cursor can be directed and/or activated via input from alpha-numeric input 907 using special keys and key sequence commands. Alternatively, the cursor may be directed and/or activated via input from a number of specially adapted cursor directing devices.

Furthermore, computer system 900 can include an input/output (I/O) signal unit (e.g., interface) 909 for interfacing with a peripheral device 910 (e.g., a computer network, modem, mass storage device, etc.). Accordingly, computer system 900 may be coupled in a network, such as a client/server environment, whereby a number of clients (e.g., personal computers, workstations, portable computers, minicomputers, terminals, etc.) are used to run processes for performing desired tasks. In particular, computer system 900 can be coupled in a system for creating an editable template from a document.

Parameterized Template Rendering

For example of the present discussion is directed toward generation and rendering of a template based on a received non-template layout. Moreover, in one example, the rendering task and likelihood determination for generating a template based on the layout is also performed.

For example, the automation of the template rendering and optimization process provides a significant reduction in time and expense since no custom rendering or manual defining of an object function for parameter optimization is needed.

For example, the discussion provided herein differs with respect to templates 4A, 5A and 7A, in that the present discussion determines a template from an already generated layout. In contrast, templates 4A, 5A and 7A are directed toward determining document template parameters for displaying various page elements based on probabilistic models of document templates. In other words, instead of determining a template layout utilizing a probabilistic model after being provided with the number of image blocks, text blocks, image scale factors, paper margins, and the like to be lain out in the document, one example described herein generates a template based on a provided layout that already has the text blocks and image blocks placed thereon. It should be noted that in various embodiments, the processes described below are performed automatically.

Figure 10:
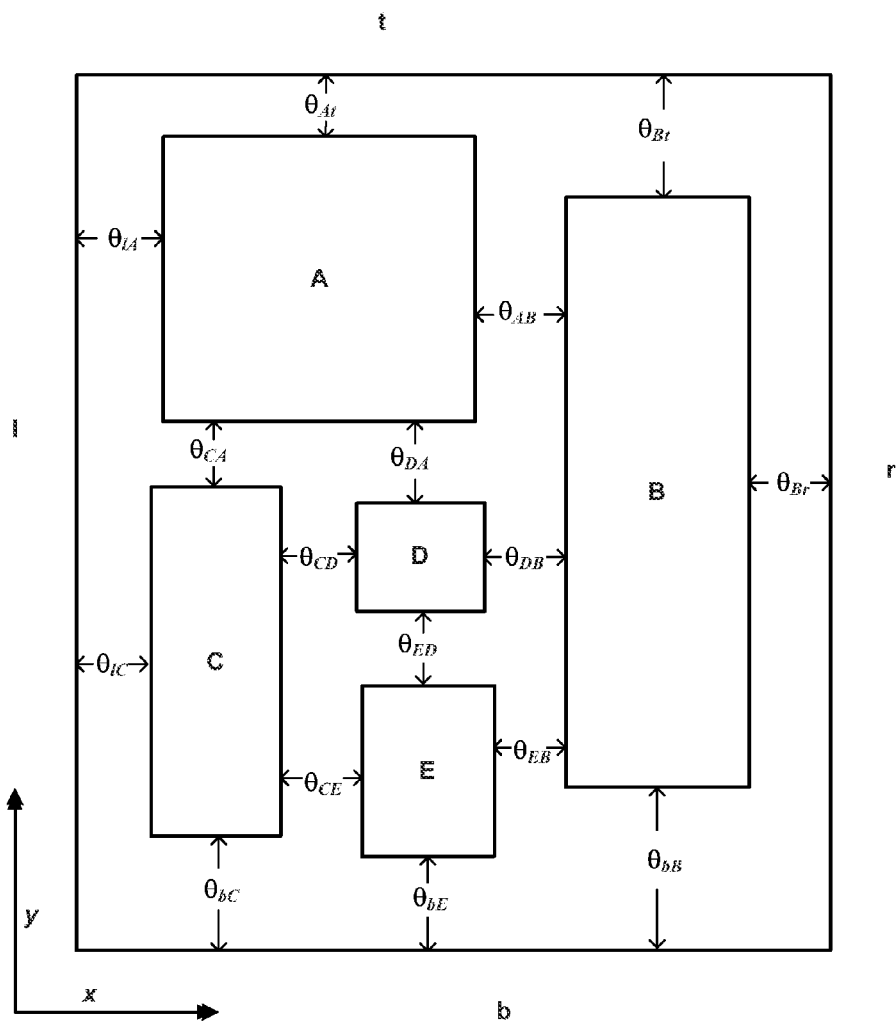
FIG. 10 is a block diagram of a non-template graphical layout in accordance with one example.

With reference now to FIG. 10, a block diagram 1000 of a non-template graphical layout for template parameterization. For example, diagram 1000 includes blocks A-E. In general, each of blocks A-E may be an image block or a text block. In addition, each of the boundaries between blocks A-E is a parameter representing white space between the blocks in the horizontal or vertical directions. In layout 1000, the margins are indicated as top (t), left (l), bottom (b), and right (r). For purposes of clarity in the present discussion, the same language, e.g., $\theta_{iC}$ is used to identify white space in the non-template single page graphical layout similar to the discussions of FIGS. 4A, 5A and 7A.

For example, one example receives a layout 1000 upon which objects A-E have already been placed. For example, for purposes of clarity in the present discussion, each of objects A-E is either an image block or a text block.

Figure 11:
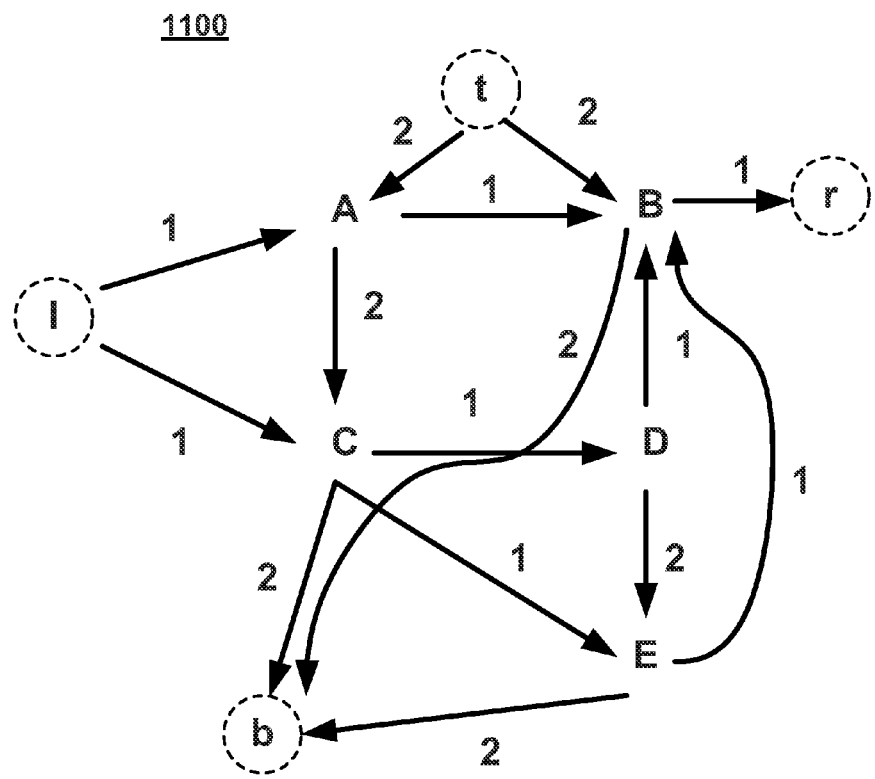
FIG. 11 is a graphical parameterization of a pre-defined graphical layout in accordance with one example.

Referring now to FIG. 11, a graphical parameterization 1100 of a pre-defined graphical layout. Each edge represents a white space parameter. For purposes of clarity, the direction of the edge between a source block and a target block is represented by the nomenclature 1 and 2. Where 1 signifies that the source block is to the right of the target block and 2 signifies that the source block is below the target block.

With reference now to FIG. 12, a block diagram of a first incidence matrix 1210 and a second incidence matrix 1220 is shown. In other words, the graphical parameterization 1100 information is provided to two incidence matrices. One matrix 1210 for a first direction and the other matrix 1220 for a second direction orthogonal to the first direction. For example, the first direction matrix 1210 is horizontal or in the x-direction and reads across the original layout from left (l) to right (r). Similarly, the second direction matrix 1220 is vertical or in the y-direction and reads across the original layout from bottom (b) to top (t). Although starting from the left or bottom is arbitrary, for purposes of clarity, the discussion utilizes the left (l) margin and the bottom (b) margin of original layout 1000 as guide object lines.

Figure 13:
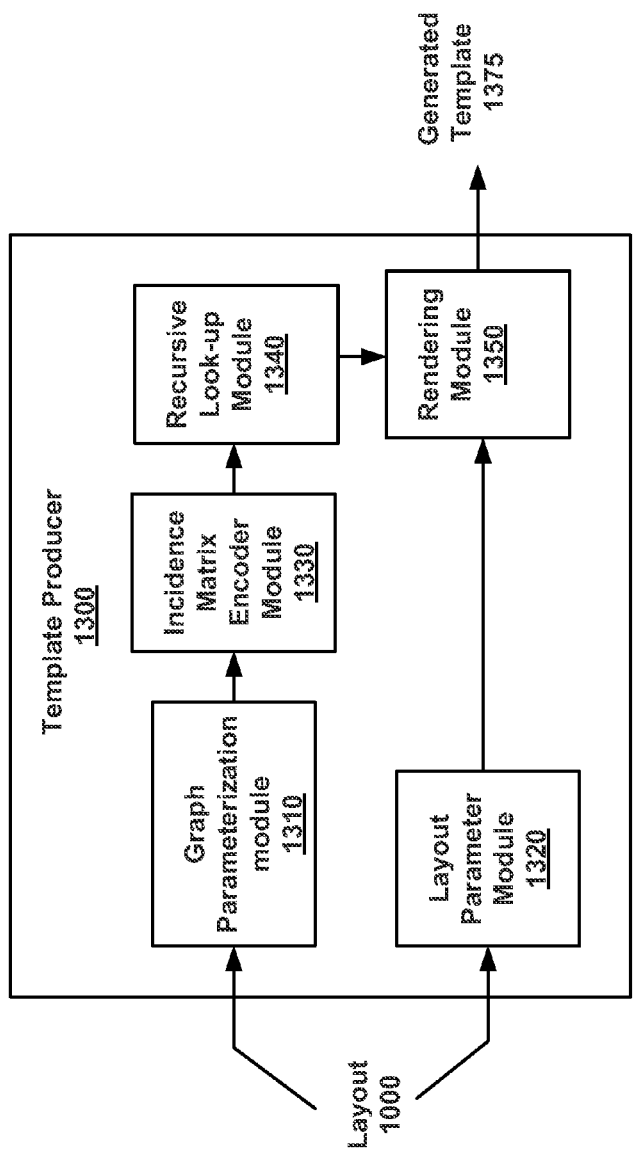
FIG. 13 is a block diagram of a pre-defined layout template generator in accordance with one example.

Referring now to FIG. 13, a block diagram of a template producer 1300 for a pre-defined layout 1000. For example, template producer 1300 includes a graph parameterization module 1310, a layout parameter module 1320, an incidence matrix encoder module 1330, a recursive look-up module 1340 and a rendering module 1350.

For example, template producer 1300 receives a pre-defined layout 1000 and provides a tangible distinctly different generated template 1375. In other words, pre-defined layout 1000 is a single design such as a page 1 of a brochure, pamphlet or the like. In contrast, generated template 1375 is a template based on pre-defined layout 1000 that can be used to provide multiple pages having similar layouts.

For example, a car dealer may want a ten page car brochure wherein each page provides information about a different car. However, the car dealer may want a similar layout per page. Moreover, the car dealer may have drawn or may have had a professional designer draft a single page that represents the desired layout. Template producer 1300 would receive the single page layout 1000 and then provide generated template 1375 which can be used to produce multiple pages having the same or a similar layout as the original layout 1000. For example, the pages would have a similar layout but may be stretched or adjusted to fit the different content.

For example, graph parameterization module 1310 receives the original layout 1000 and generates a graph parameterization such as parameterization 1100 of FIG. 11. For example, incidence matrix encoder module 1330 receives the graph parameterization from graph parameterization module 1310 and encodes the information into at least two matrices such as matrices 1210 and 1220 of FIG. 12.

Recursive look-up module 1340 accesses the matrices of encoded information provided by incidence matrix encoder module 1330 such as matrices 1210 and 1220 of FIG. 12. Recursive look-up module 1340 then works backward through the matrix beginning at the edge of the selected block until the known guide object line is reached to determine a set of total distance breakdown information.

For example, layout parameter module 1320, determines or receives parameter information about layout 1000. In general, parameter information may include, but is not limited to, image size (height and width), image scale factors, paper margins, text block size (height and width), white space (height or width), e.g., boundaries between blocks and the like.

Rendering module 1350 utilizes the different distance breakdown information from recursive look-up module 1340 and the parameter information from layout parameter module 1320 to determine the coordinates of at least two orthogonal sides of the selected block. In conjunction with the size parameters of the selected block, rendering module 1350 can render the block on the template in the appropriate location. Once all selected blocks of the layout have been rendered, rendering module 1350 outputs the generated template 1375. For example, all selected blocks of the layout 1000 include Blocks A-E. However, in another example, other input may cause one or more blocks of A-E to be ignored during the template producing process.

Figure 14:
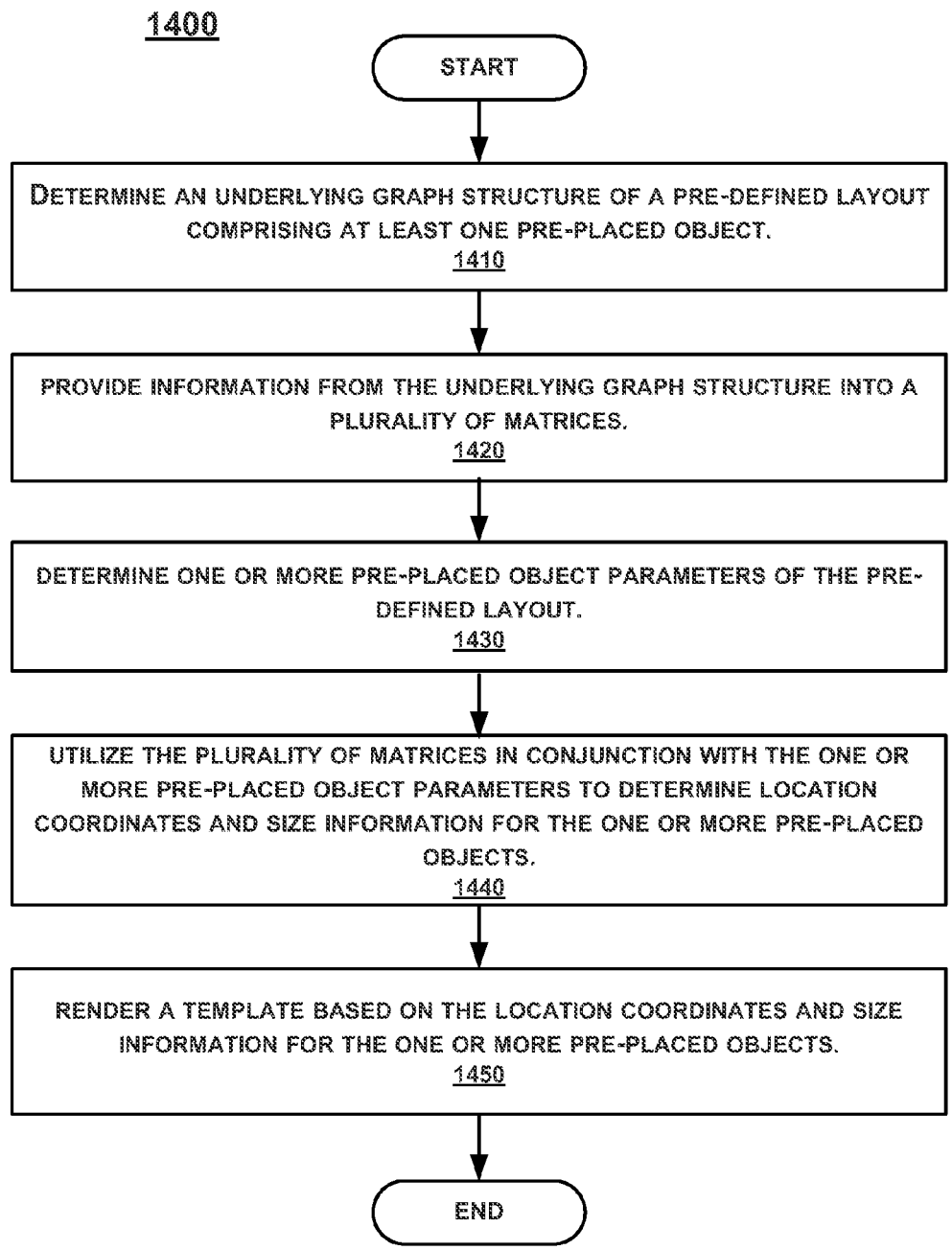
FIG. 14 is a flow diagram of a method for generating and rendering a template of a pre-defined graphical layout in accordance with one example.

With reference now to FIG. 14, a flow diagram of an example method for generating and rendering a template of a pre-defined graphical layout is shown.

Referring now to 410 of FIG. 14 and to FIG. 13, one example determines an underlying graph structure of a pre-defined layout comprising at least one pre-placed object. For example, graph parameterization module 1310 receives the original layout 1000 and generates a graph parameterization such as parameterization 1100 of FIG. 11. For example, the underlying graph structure of the layout is then determined.

For example, the underlying graph structure is determined by utilizing guide objects that are vertical or horizontal lines that have absolute x or y coordinates. For example, in FIG. 10, the guide object vertical line is the left margin (l) and the horizontal line is the bottom margin (b). FIG. 11 illustrates an example of an underlying graph structure of layout 1000 having left margin (l) and bottom margin (b) guide object lines.

For example, each object (vertex) may be of three types: an image block, a text block or a guide. For example, an example of a guide would be one or margins such as t, b, l, and r of FIG. 10. In another example, guide objects may be any lines that have absolute x or y co-ordinates. In other words, if the guide object is a line then the location of the line with respect to the provided layout must be a known.

For example, guide objects may be vertical or horizontal lines that have absolute x or y co-ordinates. In another example, the guide objects do not need to be vertical or horizontal lines. For example, the guide objects may be one or more orthogonal diagonal lines that have known x or y co-ordinates.

In other words, if the guide objects are diagonal lines, the guide objects must provide enough known information to precisely identify the diagonal lines' location with respect to the layout. In other words, the known information must include two or more points, a single point and a slope of the line, or the like. For example, the guide object line may be defined by one or more coordinate points such as, but not limited to, a starting location, an ending location, any known coordinate point on the line, etc. However, if a single coordinate point is known, then the slope of the guide object line must also be known. In another example, the guide objects may include a combination of diagonal, vertical and horizontal lines.

For example, more than two guide object lines may be used. For example, as described below, by utilizing additional guide object lines a layout can be broken down into smaller layout sections. For example, one or more of the section is then parameterized in a graph, represented in the matrices and rendered.

With respect to the auto-generating likelihood function, parameters may be set to be equal, for example, for centering. In addition, a cut in a layout may be deemed as a guide to create two or more layout sections. For example, a cut in a layout may be as straight forward as a two column layout where images do not cross the centerline. For example, the parameters split across the guide such as shown below.

The following is one example of a parameter that is not split across a guide:

$$A \xrightarrow{\theta_{AB}} B$$

Now, an example of new parameter is shown after A to B is split by a guide m:

$$A \xrightarrow{\theta_{Am}} m \xrightarrow{\theta_{mB}} B$$

Thus, as illustrated in the above examples, the addition of a guide does not detrimentally impact either the rendering or likelihood functions. Instead, as can be seen, the addition of guide m merely adds another column and row to the matrices, but does not change the template rendering operation.

For example, all paths from guide to guide are enumerated. In another example, paths may be linked to allow for joint optimization. For example, for text flow in a multi-column layout. For example, each path results in a vector $\vec{x}$ (or a vector $\vec{y}$) and an overall path width W (or height H).

Thus, for example, the likelihood function over paths may be derived as shown below:

$$P(\vec{W}, \vec{H}, \vec{x}, \vec{y} \mid \vec{\Theta}) \propto \prod_i \prod_j N\left(W_i \middle| \vec{\Theta}^T \vec{x}_i, \alpha_i^{-1}\right) N\left(H_j \middle| \vec{\Theta}^T \vec{y}_j, \beta_j^{-1}\right)$$

Please note, this equation is equation (2) and is described previously herein including at least the discussion of FIG. 6.

With reference now to 420 of FIG. 14 and to FIG. 13, one example provides information from the underlying graph structure into a plurality of matrices. For example, incidence matrix encoder module 1330 receives the graph parameterization from graph parameterization module 1310 and encodes the information into at least two matrices such as matrices 1210 and 1220 of FIG. 12. For example, the two matrices 1210 and 1220 are based on different guide objects. For example, matrix 1210 provides graph parameterization information from left to right in a horizontal direction, while matrix 1220 provides graph parameterization information from bottom to top in a vertical direction.

For example, with respect to FIG. 12, for example, the first direction matrix 1210 is horizontal or in the x-direction. That is, read from left (l) to right (r). Similarly, the second direction matrix 1220 is vertical or in the y-direction. That is, read from bottom (b) to top (t). Although starting from the left or bottom is arbitrary, for purposes of clarity, the discussion utilizes the right (r) margin and the bottom (b) margin as guide object lines.

With reference now to 430 of FIG. 14 and to FIG. 13, one example determines one or more pre-placed object parameters of the pre-defined layout. For example, layout parameter module 1320, determines or receives parameter information about layout 1000. In general, parameter information may include, but is not limited to, image size (height and width), image scale factors, paper margins, text block size (height and width), white space (height or width), e.g., boundaries between blocks and the like.

For example, the text block size (height and width) may be a constant for all text blocks. Similarly, for example, the white space size (height or width) may be a constant between all objects. However, in another example, the white space size may differ between objects. In yet another example, the text block size may differ between text blocks.

For example, an image block in the non-template single page graphic layout has an associated scale parameter. The scale parameter may be manually provided, or may be generated. For example, the graphic layout may be scanned and a scale parameter for the image block may be generated. In another example, the scale parameter may be manually provided by the maker of the single page graphic layout.

Referring now to 440 of FIG. 14 and FIG. 13, one example utilizes the plurality of matrices in conjunction with the one or more pre-placed object parameters to determine location coordinates and size information for the one or more pre-placed objects. For example, recursive look-up module 1340 accesses the matrices of encoded information provided by incidence matrix encoder module 1330. For example, recursive look-up module 1340 begins operation by selecting a block to be rendered. Recursive look-up module 1340 then accesses the at least two matrices such as matrices 1210 and 1220 of FIG. 12 at the column designating an edge of the selected block. Recursive look-up module 1340 then works backward from the edge of the selected block to determine the different distance breakdowns between the edge of the selected block and the guide line. For example, the different distance breakdowns may include, any white space, any intermediate object widths (or heights), and the like.

For example, once the two incidence matrices 1210 and 1220 are filled per the graph parameterization 1100 and the template parameters are determined, recursive lookups utilizing incidence matrices 1210 and 1220 can be used to generate the x and y-coordinates of any objects A-E to be rendered.

For example, with respect to incidence matrix 1210, template producer 1300 determines the left side x-coordinate of block E($x_E$):

$$x_E = \theta_{CE} + W_C + \theta_{lC}$$

where $\Theta_{CE}$ is the width of the white space between the block C and block E, $W_C$ is the width of C, $$\text{For example, } W_C = \theta_C * \text{width of } C \text{ in pixels (if } C \text{ is an image)}$$

$$= \text{constant (if } C \text{ is a text block), and}$$

$\theta_{lC}$ is the width of the white space between the left (l) margin and block C.

In other words, as shown by the above equation, to find the left side x-coordinate of block E($x_E$), the template producer 1300 would access matrix 1210 and search column E. The result is distance ($\Theta_{CE}$): the total width of the white space between the right side of block C and the left side of block E.

The template producer 1300 would then find the value defining the width of block C. For example, if block C is a text block having a constant size, the template producer 1300 would use the constant width size. In another example, if block C is an image block template producer 1300 would use the width of the image block C.

Template producer 1300 would then access matrix 1210 and search column C. The result is distance ($\theta_{lC}$): the total width of the white space between the left (l) margin and the left side of block C.

For example, template producer 1300 would recognize that the left (l) margin is the known starting point, e.g., the guide object in the horizontal direction, and know that no further distance measurements or matrix 1210 recursive lookups are needed.

Then, by adding the total width of the white space between the right side of block C and the left side of block E ($\Theta_{CE}$), the width of C($W_C$) and the total width of the white space between the left (l) margin and the left side of block C($\theta_{lC}$); the total distance between the x-coordinate guide object and the left side of block E is determined. That is, the x-coordinate location for the left side of block E is now a known.

However, knowing the x-coordinate location for the left side of block E is not enough information to render block E. In other words, although the x-coordinate location for the left side of block E is known, and the width and height of block E are also known; a y-coordinate, e.g., the location of a top or bottom edge of block E, is not known.

Template producer 1300 now utilizes incidence matrix 1220 to determine the bottom (b) side y-coordinate of box E using the same automated recursive lookup methodology ($y_E$):

$$y_E = \theta_{bE}$$

where $\Theta_{bE}$ is height of the white space between the bottom (b) margin and block E.

In other words, as shown by the above equation, to find the bottom side y-coordinate of block E($y_E$), the template producer 1300 would access matrix 1220 and search column E. The result is distance ($\theta_{bE}$): the total height of the white space between the bottom (b) margin and the bottom side of block E.

For example, template producer 1300 would recognize that the bottom (b) margin is the known y-coordinate starting point, e.g., the guide object in the vertical direction, and that no further distance measurements or matrix 1220 recursive lookups are needed. As such, the total distance between the y-coordinate guide object and the bottom side of block E is determined to be the distance $\theta_{bE}$. The y-coordinate location of the bottom (b) of block E is now known.

By utilizing the x-coordinate ($x_E$) for the left side of block E, the y-coordinate ($y_E$) for the bottom side of block E, and the height and width of block E; block E can be rendered on a template without requiring any manual interaction.

For purposes of clarity, an example of a second recursive lookup utilizing incidence matrices 1210 and 1220 to generate the x and y-coordinates of object D is provided. However, since in various embodiments the procedure is automatically performed, this example will not be as detailed as the example provided for finding the x and y-coordinates of block E. Again, by finding the x and y coordinates of object D, object D can be rendered on a template.

For example, to find the x-coordinate of the left side of block D, template producer 1300 accesses matrix 1210 and searches column D. The result is distance ($\theta_{CD}$): the total width of the white space between the right side of block C and the left side of block D.

Template producer 1300 would then find the value defining the width of block C. Template producer 1300 would then access matrix 1210 and search column C. The result is distance ($\theta_{lC}$): the total width of the white space between the left (l) margin and the left side of block C.

As previously described, template producer 1300 would recognize that the left (l) margin is the guide object in the horizontal direction and that no further distance measurements or matrix 1210 recursive lookups are needed.

The resultant left side x-coordinate of block D($x_D$) is shown as:

$$x_D = \theta_{CD} + W_C + \theta_{lC}$$

Template producer 1300 now utilizes incidence matrix 1220 to determine the bottom (b) side y-coordinate of box D. For example, a search of column D provides a result distance ($\theta_{ED}$): the total height of the white space between the top side of block E and the bottom side of block D.

Template producer 1300 would then find the value defining the height of block E($H_E$). Template producer 1300 would then access matrix 1210 and search column E. The result is distance ($\theta_{bE}$): the total height of the white space between the bottom (b) margin and the bottom side of block E.

As previously described, template producer 1300 would recognize that the bottom (b) margin is the guide object in the vertical direction and that no further distance measurements or matrix 1220 recursive lookups are needed.

The resultant bottom side y-coordinate of block D($y_D$) is shown as:

$$y_D = \theta_{ED} + H_E + \theta_{bE}$$

By utilizing the x-coordinate ($x_D$) for the left side of block D, the y-coordinate ($y_D$) for the bottom side of block D, and the height and width of block D; block D can be rendered on a template without requiring any manual interaction.

Referring now to 450 of FIG. 14, one example renders a template based on the location coordinates and size information for the one or more pre-placed objects. For example, rendering module 1350 receives the different distance breakdown information from recursive look-up module 1340 and the parameter information from layout parameter module 1320. For example, rendering module 1350 utilizes the information from both recursive look-up module 1340 and layout parameter module 1320 to determine specific coordinates for the location of the specified block. For example, with reference to layout 1000, the specific left side and bottom side location coordinates of a block such as block D.

In addition, rendering module 1350 utilizes the parameter information from layout parameter module 1320 pertaining to the specific block. For example, the size (width and height) of block D. Once the specific left side and bottom side location coordinates along with the size parameters of block D, have been determined, rendering module 1350 can render the block on the template. Once the blocks of the layout have been rendered, rendering module 1350 outputs the generated template 1375.

A number of examples are thus described. While being described in particular examples, it should not be construed as limited by such examples, but rather construed according to the following claims.

What is claimed is:

1. A non-transitory computer-readable medium having instructions encoded thereon for enabling a processor to perform a method for generating and rendering a template of a pre-defined layout 1000, the method comprising:
   determining an underlying graph structure of a pre-defined layout comprising one or more pre-placed objects (A-E);
   providing information from said underlying graph structure into a plurality of matrices;
   providing a first direction result o said determining of said underlying graph structure into a first direction matrix;
   providing a second direction result of said determining said underlying graph structure into a second direction matrix, the first direction orthogonal to the second direction;
   determining one or more pre-placed objects parameters of said pre-defined layout 1000;
   utilizing said plurality of matrices in conjunction with said one or more pre-placed object parameters to determine location coordinates and size information for said one or more pre-placed objects (A-E);
   utilizing a recursive lookup into said first direction matrix and said second direction matrix to generate coordinates for each one or more pre-placed objects (A-E) to be rendered on said template; and
   rendering a template based on the location coordinates and size information for said one or more pre-placed objects (A-E).

2. The non-transitory computer-readable medium of claim 1, wherein determining the underlying graph structure comprises:
   utilizing at least one first direction guide object having a known coordinate to determine at least one vector representation of the dimensions of one or more block boundaries in a first direction; and
   utilizing at least one second direction guide object having a known coordinate to determine at least one vector representation of the dimensions of one or more block boundaries in a second direction orthogonal to the first direction.

3. The non-transitory computer-readable medium of claim 1, wherein determining the underlying graph structure further comprises:
   utilizing at least one first direction guide object having a known coordinate to determine an overall path width in a first direction; and
   utilizing at least one second direction guide object having a known coordinate to determine an overall path width in a second direction orthogonal to the first direction.

4. The non-transitory computer-readable medium of claim 1, wherein determining the underlying graph structure comprises:
   dividing said pre-defined layout into at least two sections;
   utilizing at least one vertical guide object having a known x-coordinate as a vertical guide object to determine at least one vector representation of the dimensions of one or more block boundaries in a vertical direction for each of said sections; and utilizing at least one horizontal guide object having a known y-coordinate as a horizontal guide object to determine at least one vector representation of the dimensions of one or more block boundaries in a horizontal direction for each of said sections.

5. The non-transitory computer-readable medium of claim 1, wherein the method further comprises:

utilizing said underlying graph structure and one or more pre-defined layout parameters to perform a likelihood determination for said template.

6. The non-transitory computer-readable medium of claim 1 wherein said one or more pre-placed objects (A-E) are selected from a group consisting of: an image block, a text block and a guide.

7. The non-transitory computer-readable medium of claim 1 wherein said one or more pre-placed objects (A-E) are selected from a group consisting of: an image block, a text block and a guide.

* * * * *

UNITED STATES PATENT AND TRADEMARK OFFICE
CERTIFICATE OF CORRECTION

PATENT NO. : 8,429,517 B1  
APPLICATION NO. : 12/775337  
DATED : April 23, 2013  
INVENTOR(S) : Niranjan Damera-Venkata et al.

Page 1 of 1

It is certified that error appears in the above-identified patent and that said Letters Patent is hereby corrected as shown below:

In the Claims:

In column 24, line 22, in Claim 1, delete "o" and insert -- of --, therefor.

Signed and Sealed this  
Twentieth Day of August, 2013

Teresa Stanek Rea  
*Acting Director of the United States Patent and Trademark Office*